(12) United States Patent
Schramm et al.

(10) Patent No.: US 12,277,606 B2
(45) Date of Patent: Apr. 15, 2025

(54) SYSTEM AND METHOD FOR NETWORK SYNCHRONIZATION

(71) Applicant: The Health Utility Network, Inc., Oak Brook, IL (US)

(72) Inventors: David Schramm, Huntington Beach, CA (US); Troy Lacher, Franklin, TN (US); Raymond Jebsen, Nolensville, TN (US); Alexander Perry, Oakland, CA (US); Gerald Bortis, Trabuco Canyon, CA (US)

(73) Assignee: Health Utility Network, Inc., Chicago, IL (US)

( * ) Notice: Subject to any disclaimer, the term of this patent is extended or adjusted under 35 U.S.C. 154(b) by 0 days.

(21) Appl. No.: 18/592,350

(22) Filed: Feb. 29, 2024

(65) Prior Publication Data
US 2024/0320748 A1 Sep. 26, 2024

Related U.S. Application Data

(60) Provisional application No. 63/488,138, filed on Mar. 2, 2023.

(51) Int. Cl.
*G06Q 40/08* (2012.01)
(52) U.S. Cl.
CPC .................... *G06Q 40/08* (2013.01)

(58) Field of Classification Search
CPC ..................................... G06Q 40/08
See application file for complete search history.

(56) References Cited

U.S. PATENT DOCUMENTS

2024/0071633 A1* 2/2024 Bortis ............... H04L 9/50

* cited by examiner

*Primary Examiner* — Edward Chang
(74) *Attorney, Agent, or Firm* — Morgan, Lewis & Bockius LLP

(57) ABSTRACT

The various implementations described herein include methods and systems for coverage synchronization. Each participant node of a plurality of participant nodes is coupled to a respective landing zone. Each participant node transmits coverage data for a plurality of members, to the respective landing zone. In response to receiving the coverage data, each landing zone transforms the coverage data to a common resource format. In accordance with a determination that the respective landing zone shares a person identifier with other landing zones, the landing zone receives coverage updates from the other landing zones, updates coverage information in the common resource format based on the coverage updates, and evaluates coverage alignment for a member, based on the coverage information aggregated from the other landing zones sharing the person identifier, including identifying one or more discrepancies that require mediation amongst the plurality of landing zones.

20 Claims, 9 Drawing Sheets

SYSTEM AND METHOD FOR NETWORK SYNCHRONIZATION

PRIORITY CLAIM

This application claims priority to U.S. Provisional Patent Application No. 63/488,138 filed Mar. 2, 2023, which is hereby incorporated by reference in its entirety.

TECHNICAL FIELD

The disclosed implementations relate generally to healthcare applications, and more particularly, to methods and systems for network alignment in a healthcare network.

BACKGROUND

Administrative tasks associated with the payment of healthcare services depend on the availability of current healthcare coverage from at least one health plan. Traditionally, coverage information is determined using the X12 EDI 270/271 request-response transactions from providers to payers. While coverage is issued to members of a health plan by payers that directly support a member's insurance policy, provider organizations have records of coverage that they have received from the members. The difference in sources of coverage information and timing of recording such information in the systems of payers and providers lead to misalignment in coverage information which results in excessive repetitive EDI 270/271-type inquiries from providers to payers with regards to the member coverage status. This misalignment of coverage information also leads to delays in care delivery, claim denials and multiple manual interventions needed to correct the discrepancies, all of which negatively affect member and provider experiences with healthcare administration as well as increases the cost of such administration. The problem is further exacerbated when the healthcare service is covered by one or more health plans for a patient. To determine which plan is responsible for which portion of the cost there first needs to be agreement between all parties as to the details of the patient and the details of the one or more coverages. In most cases today, this process of aligning records between payers of the coverage details is not handled well. This process is often executed today through manual, time-consuming, and expensive efforts.

SUMMARY

Accordingly, there is a need to standardize the coverage alignment process to identify the misalignments and to streamline and automate the process. The techniques described herein help reduce and sometimes eliminate repetitive inquiries and any manual intervention in the determination of the details of the patient demographics and coverage information. When there are multiple coverages for a healthcare service, the systems and methods according to the techniques described herein aid in determining the primacy of coverage by the multiple payers. In this way, providers and payers servicing the same individual have an identical aligned view at any point in time of the coverage details for that individual reflected in their back-office systems. The techniques described herein can be used to deliver end-to-end coverage transparency for payers, providers, and members, determine and fix coverage misalignment prior to point of care, provide direct, real-time, pre-encounter exchange of all applicable coverage data, eliminate EDI 270/271 transactions, drive payer & provider partnership to benefit the member/patient, provide clarity and certainty of service level coverage, and/or reduce transactions thereby minimizing errors.

In accordance with some implementations, a system for coverage alignment includes a plurality of participant nodes. Each participant node is coupled to a respective landing zone of a plurality of landing zones. Each participant node is configured to transmit coverage data for a plurality of members, to the respective landing zone. Each landing zone is configured to: in response to receiving the coverage data, transform the coverage data to a common resource format; in accordance with a determination that the respective landing zone shares a person identifier with other landing zones: receive unsolicited coverage updates from the other landing zones; update coverage information in the common resource format based on the unsolicited coverage updates; and evaluate coverage alignment for a member of the plurality of members, based on the coverage information aggregated from the other landing zones in the plurality of landing zones sharing the person identifier, including identifying one or more discrepancies that require mediation amongst the plurality of landing zones, for the person identifier.

In some implementations, a first participant node of the plurality of participant nodes is configured to: receive the updated coverage information from a first landing zone of the plurality of landing zones; receive an updated record containing a modification to a specific data element in the updated coverage information; and transmit the modification to the first landing zone; the first landing zone is configured to: receive, from the participant node, and using, the modification to resolve the one or more discrepancies; and propagate the modification to landing zones other than the first landing zone that share the person identifier.

In some implementations, the first participant node of the plurality of participant nodes is further configured to: provide a user interface for the user to compare their coverage data against the updated coverage information; provide, via the user interface, recommended actions for the user to take to align their organization's coverage data; and provide, via the user interface, a mechanism for the user to provide input on what actions were taken and review a history of previous actions taken by other users.

In some implementations, the coverage data transmitted by each participant node includes (i) known active records, (ii) inactive records, and (iii) update to records.

In some implementations, a first landing zone of the plurality of landing zones is configured to: resolve the one or more discrepancies by mediating amongst one or more landing zones that share the person identifier.

In some implementations, each of the landing zones is configured to evaluate the coverage records, and resolve any identified discrepancies, before providing an approval for a service for the member.

In some implementations, each of the landing zones is configured to evaluate the coverage alignment, and resolve any identified discrepancies, on a periodic basis.

In some implementations, a first participant node of the plurality of participant nodes is configured to transmit the coverage data for the plurality of members, to the respective landing zone, via a push or pull integration with the respective landing zone.

In some implementations, each of the landing zones is configured to: in response to receiving the coverage data: extract a subset of person identity information from the coverage data; transmit the subset to an identity matching service; and receive the unique person identifier from the identity matching service, in response.

In some implementations, a first landing zone of the plurality of landing zones is configured to: in response to receiving the coverage data: transmit coverage resource locators for the coverage data and the person identifier to a data index service; and the data index service is configured to: in response to receiving the coverage resource locators and the person identifier: register resources corresponding to the coverage resources so they can become discoverable.

In some implementations, the data index service is configured to: in response to receiving the coverage resource locators and the person identifier: identify other coverage resources provided by other participants that share the person identifier; confirm with an authorization service if is appropriate to notify each participant with shared knowledge of the person identifier about available resources; and upon a positive confirmation from the authorization service, notify each participant application of resource locations of the coverage resource locators; and the authorization service is configured to: analyze contractual terms indicating what participants (sometimes referred to as participant nodes) are subscribed to what solutions and what resource types those solutions necessitate to verify data sharing request from the data index service and notifying the data index service if information sharing between participants is appropriate. A solution is a software product developed for deployment and distribution to participant's nodes. Solutions can make use of data persisted in a FHIR server and invoke the data index and authorization services.

In some implementations, a first landing zone of plurality of landing zones is configured to: subscribe to an automated notification feature of the data index service, thereby receiving a notification of the resource locations of coverage data stored in each participant's Fast Healthcare Interoperability Resources (FHIR) server; acquire own coverage resources from a FHIR server; issue a request to FHIR server of other participants with a shared person identifier. The request contains the other participants' FHIR server resource locations for a requested coverage resource; and in response, receive a coverage resource from the other participants; and landing zones corresponding to the other participants configured to; in response to receiving a request to share a coverage resource: verify sharing appropriateness with the authorization service; and in response to a positive confirmation from the authorization service, allow access to the coverage resource to the requesting participant's coverage application.

In some implementations, the first landing zone of the plurality of landing zones is further configured to record, to a blockchain, events associated with issuing the request to the FHIR server of other participants, receiving the coverage resource from the other participants, and responses with the coverage resource, without protected health information.

In some implementations, a first landing zone is configured to: provide a coverage synchronization user interface for a user, to access a list for viewing coverage records submitted by the plurality of participant nodes; obtain a selection, by the user, via the coverage synchronization user interface, a coverage record to view coverage details that include coverage synchronization review outcomes for each participant node that provided coverage for a person identifier; providing, to the user, coverage details for each participant node that assists the user to discern relevant data for understanding a recommended action and applying the recommended action in a source system; obtaining necessary adjustments to a record in the source system, including recording, by the user, action they took in the source system and in the coverage synchronization user interface; obtaining an indications, by the user, if they applied the recommended action or took a different action or no action; in accordance with the user taking a different action than was recommended by the coverage synchronization user interface, applying, for the user, a note documenting the discrepancy between the recommended action and a final determination made by the user; where a user applied an update or change to the record in the source system, providing, by the source system, an updated coverage resource to a corresponding participant node's coverage data store; distributing, by the corresponding participant node, the updated coverage resource to their landing zone via their push or pull integration; and after applying an update or change to the coverage record in the source system, providing, to the user, coverage record in the coverage synchronization user interface.

In another aspect, a method is provided for network synchronization. The method includes, at each participant node of a plurality of participant nodes. Each participant node is coupled to a respective landing zone of a plurality of landing zones; and transmitting coverage data for a plurality of members, to the respective landing zone. The method also includes, at each landing zone of the plurality of landing zones: in response to receiving the coverage data, transforming the coverage data to a common resource format; in accordance with a determination that the respective landing zone shares a person identifier with other landing zones: receiving unsolicited coverage updates from the other landing zones; updating coverage information in the common resource format based on the unsolicited coverage updates; and evaluating coverage alignment for a member of the plurality of members, based on the coverage information aggregated from the other landing zones in the plurality of landing zones sharing the person identifier, including identifying one or more discrepancies that require mediation amongst the plurality of landing zones, for the person identifier.

In some implementations, the method further includes, at a first participant node of the plurality of participant nodes: receiving the updated coverage information from a first landing zone of the plurality of landing zones; receiving an updated record containing a modification to a specific data element in the updated coverage information; and transmitting the modification to the first landing zone. The method also includes, at the first landing zone: receiving, from the participant node, and using, the modification to resolve the one or more discrepancies; and propagating the modification to landing zones other than the first landing zone that share the person identifier.

In some implementations, the method further includes: providing a user interface for the user to review the coverage data against the updated coverage information; providing, via the user interface, recommended actions for the user to take to align their organization's coverage data; and providing, via the user interface, a mechanism for the user to provide input on what actions were taken and review a history of previous actions taken by other users.

In some implementations, the coverage data transmitted by each participant node includes (i) known active records, (ii) inactive records, and (iii) update to records.

In some implementations, the method further includes: at a first landing zone of the plurality of landing zones, resolving the one or more discrepancies by mediating amongst one or more landing zones that share the person identifier.

In some implementations, the method further includes: at each of the landing zones, evaluating the coverage alignment, and resolving any identified discrepancies, before providing an approval for a service for the member.

In some implementations, the method further includes: at each of the landing zones, evaluating the coverage alignment, and resolving any identified discrepancies, on a periodic basis.

In some implementations, the method further includes: at a first participant node of the plurality of participant nodes: transmitting the coverage data for the plurality of members, to the respective landing zone, via a push or pull integration with the respective landing zone.

In some implementations, the method further includes: at each of the landing zones: in response to receiving the coverage data: abstracting a subset of person identity information from the coverage data; transmitting the subset to an identity matching service; and receiving the person identifier from the identity matching service, in response.

In some implementations, the method further includes: at a first landing zone of the plurality of landing zones: in response to receiving the coverage data: transmitting coverage resource locators for the coverage data and the person identifier to a data index service; and at the data index service: in response to receiving the coverage resource locators and the person identifier: registering resources corresponding to the coverage resources so they can become discoverable.

In some implementations, the method further includes: at the data index service: in response to receiving the coverage resource locators and the person identifier: identifying other coverage resources provided by other participants that share the person identifier; confirming with a authorization service if is appropriate to notify each participant with shared knowledge of the person identifier about available resources; and upon a positive confirmation from the authorization service, notifying each participant application of resource locations of the coverage resource locators; and at the authorization service: analyzing contractual terms indicating what participants are subscribed to what solutions and what resource types those solutions necessitate to verify if information sharing between participants is appropriate.

In some implementations, the method further includes: at a first landing zone of plurality of landing zones: subscribing to an automated notification feature of the data index service, thereby receiving a notification of the resource locations of coverage data stored in each participant's Fast Healthcare Interoperability Resources (FHIR) server; acquiring own coverage resource from a FHIR server; issuing a request to FHIR server of other participants with a shared person identifier. The request contains the other participants' FHIR server resource locations for a requested coverage resource; and in response, receiving a coverage resource from the other participants; and at landing zones corresponding to the other participants; in response to receiving a request to share a coverage resource: verifying sharing appropriateness with the authorization service; and in response to a positive confirmation from the authorization service, responding, via participant's FHIR server, with the coverage resource to the requesting participant's coverage application.

In some implementations, the method further includes: recording, to a blockchain, events associated with issuing the request to the FHIR server of other participants, receiving the coverage resource from the other participants, and responses with the coverage resource, without protected health information.

In some implementations, the method further includes: providing a coverage synchronization user interface for a user, to access a work queue for viewing coverage records submitted by the plurality of participants; selecting, by the user, via the coverage synchronization user interface, a coverage record to view coverage details that include coverage synchronization review outcomes for each participant that provided coverage for a person identifier; viewing, by the user, coverage details for each participant that assists the user to discern relevant data for understanding a recommended action and applying the recommended action in a source system; performing necessary adjustments to a record in the source system, including recording, by the user, action they took in the source system and in the coverage synchronization user interface; indicating, by the user, if they applied the recommended action or took a different action or no action; in accordance with the user taking a different action than was recommended by the coverage synchronization user interface, applying, by the user, a note documenting the discrepancy between the recommended action and a final determination made by the user; where a user applied an update or change to the record in the source system, providing, by the source system, an updated coverage resource to the participant's coverage data store; distributing, by the participant, the updated coverage resource to their environment via their push or pull integration; and after applying an update or change to the coverage record in the source system, selectively observing, by the user, coverage record in the coverage synchronization user interface.

According to some implementations, an electronic device includes one or more processors, memory, a display, and one or more programs stored in the memory. The programs are configured for execution on the one or more processors and are configured to perform one or more methods when the program is activated.

Both the foregoing general description and the following detailed description are exemplary and explanatory, and are intended to provide further explanation of the invention as claimed.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Uncertainty or poor coverage information at point-of-care initiates a ripple effect of inefficiencies, costs, lost time, and revenue. For example, 47% of revenue cycle administrative costs are from eligibility and benefit verification efforts. 20% of revenue cycle expenses stem from claim denials. 27% of initial claim denials are from eligibility and registration errors. 65% of denied claims are never resubmitted. 11% of initial claim submissions are denied, and denials rate is increasing 11% year-over-year. Conventional systems make use of eligibility forms (EDI 270) and the claim adjustment reason codes (CARC) returned on the EDI 271 forms. When there are still questions regarding coverage, a provider may call one or more payers to make a determination or may use their own rules to attempt to determine the ordering and percentages. Today's revenue cycle activities for a coverage verification include a multitude of manual and automated workflows each with the potential for errors and delays. The verification may be performed and/or repeated during registration, each encounter, claim billing, and/or claim rejections. Verification may be performed on mobile applications, phones, web portals, etc. In contrast, the techniques described herein may be performed directly from payers, include unsolicited and automated updates, in real-time, so that participants of a network always have current information regarding coverage. Moreover, the system according to the techniques automatically generates alerts if errors are detected.

The techniques described herein can be used to provide coverage alignment to ensure each participating organization has certainty that other organizations servicing the same member/patient, have the correct coverage detail information in their respective source systems to ensure clean organization-to-organization transaction flow. While organizations serving the same individual seek to acquire, copy, update, and retain coverage detail data from the authoritative policy providing payer, these organizations may, for example:

- fail in their attempt to obtain this coverage detail (such as due to incorrect person identifying information);
- fail to accurately record this coverage detail;
- fail to be aware of available coverage, thus failing to seek coverage detail;
- fail to be aware of coverage changes (such as life-event changes or terminated coverage); and/or
- fail to update previously recorded coverage detail with newly available coverage detail These common failures lead to one or more parties having misaligned coverage details in their respective source systems, leading to unnecessary repeated inquiries, unnecessary multi modes of inquiries, denials, incorrect patient balances, write-offs, retractions and other costly administrative and patient dissatisfaction outcomes.

Figure 1:
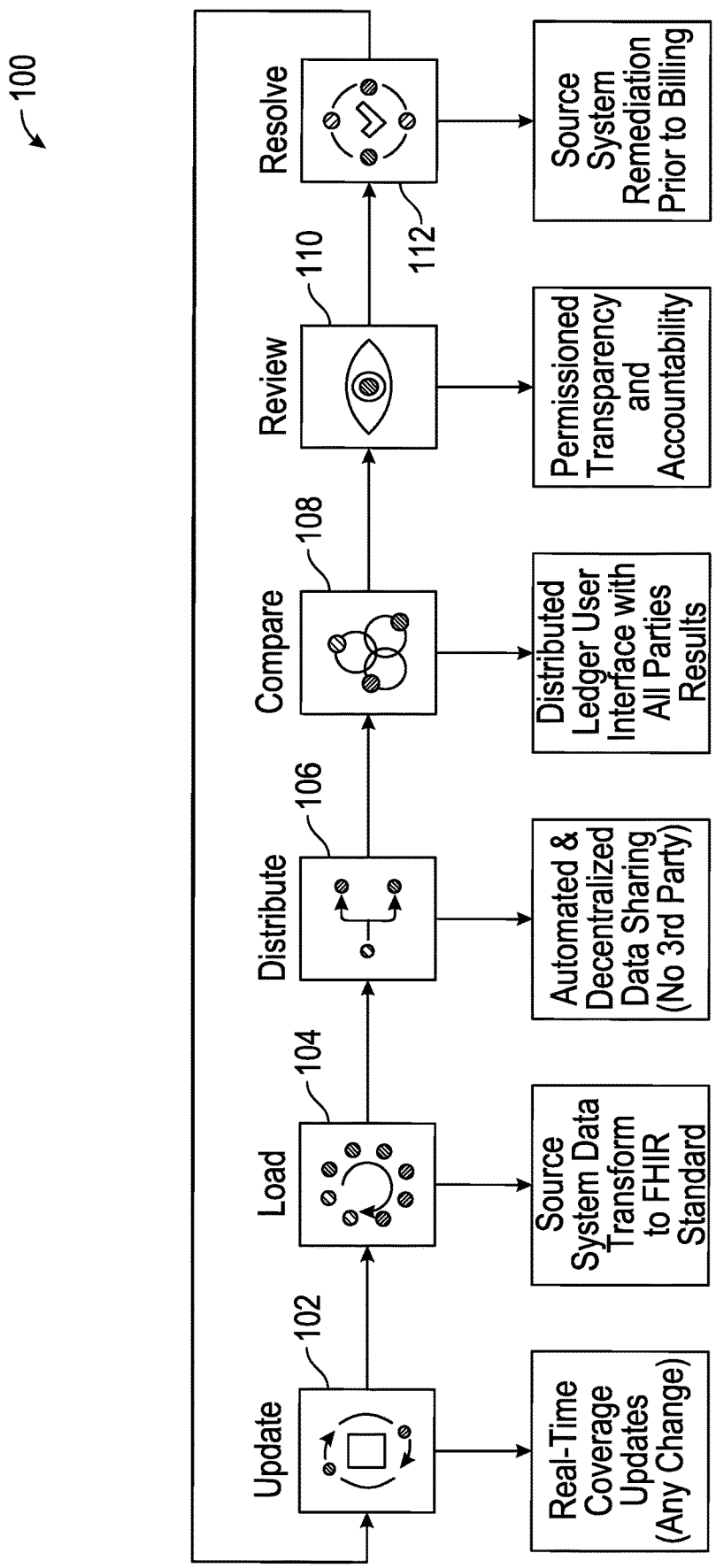
FIG. 1 shows a schematic diagram of an example system for coverage alignment, according to some implementations.

FIG. 1 shows a schematic diagram of an example system 100 for coverage alignment, according to some implementations. The example shows a distributed design of a network that enables a person's insurance coverages to be known by payers/providers in real-time. In some implementations, the system 100 is implemented using modern private cloud based software-as-a-service (SaaS), infrastructure-as-a-service (IaaS), and/or network-as-a-service (NaaS) standards, operating under distributed and decentralized architecture. The example system 100 shows a high-level workflow that can be used to detect coverage mis-alignment.

In the step labeled update 102, organizations participating in a solution provide their active coverage records for members and patients. In some implementations, the organizations also provide their inactive coverage records going back a predetermined amount of time (e.g., 1 year). Any time there is a change to coverage for any field in the coverage data spec, organizations automate the distribution of a coverage resource update to a corresponding protected environment (sometimes referred to as a landing zone).

In the step labeled load 104, in each protected environment, an interface engine, such as Mirth Connect, transforms the coverage data into a common data format, such as the Fast Healthcare Interoperability Resources (FHIR), a standard for exchanging clinical and administrative healthcare information.

In the step labeled distribute 106, each participant that shares a member/patient with other participants based on a unique person identifier, receives automated and unsolicited coverage updates from other organizations. Traditional means for discovering coverage updates happen on a REQUEST basis, and organizations have to issue these requests multiple times for a single patient encounter, just to ensure they always have the latest coverage details. With coverage synchronization techniques described herein, organizations always have the latest coverage details, dynamically updated to their environment, for each change to coverage. Moreover, traditional means for obtaining updated coverage most often occurs by transacting data through a third party, like a clearinghouse. With coverage synchronization (sometimes referred to as coverage alignment), participants exchange coverage details directly with one another without that data ever being seen or stored by any central server.

In the step labeled compare 108, the coverage synchronization application is distributed to each participant's environment. As each participant has the same aggregate of coverage data as all other participants where they share a person identifier, coverage alignment evaluation can execute locally within each participant's environment, rather than through a centralized application.

In the step labeled review 110, organization users are exposed to required coverage corrections through a user interface, where they can see not only their own coverage, but also coverage provided by other participants. This level of transparency ensures users have full awareness of all known coverage for a patient or member, as well as full visibility into the correct and authoritative coverage details they need, to make sure these details are represented accurately in their source system.

In the step labeled resolve 112, using the coverage synchronization insights and the up-to-date coverage details, users can make modifications to coverage in their source system when remediation is required. The updates performed in step 112 are pushed and the cycle begins at 102 until all records are aligned. In some implementations, the steps labeled 110 and 112 are optional. For example, the user review portion can be automated and any updates are pushed directly to a source system, bypassing the user.

In some implementations, this entire flow is performed on a daily basis, ensuring coverage is current and correct before scheduling, before encounters, and before billing.

Figure 2:
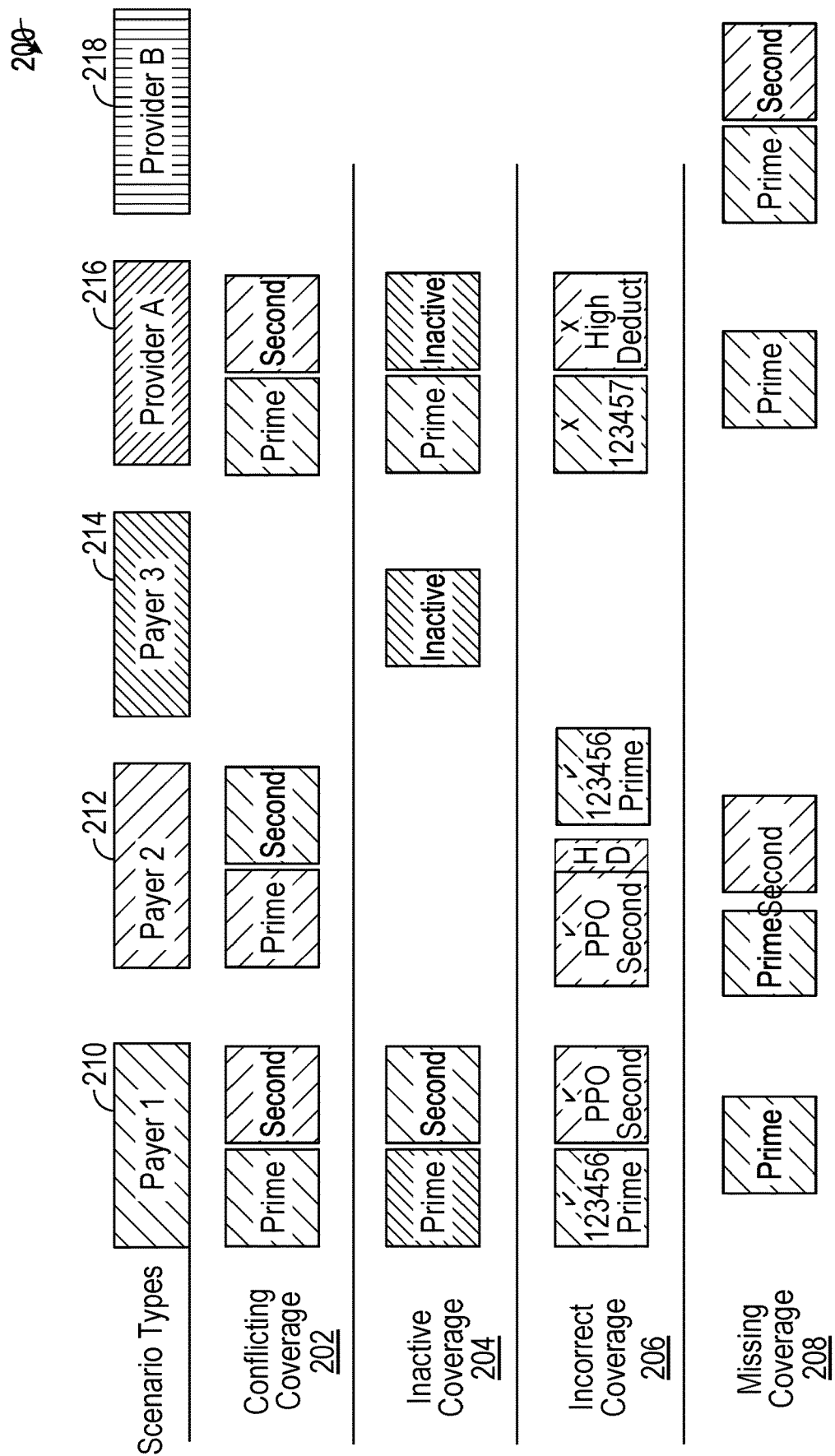
FIG. 2 shows examples of coverage misalignments.

There are various categories for misalignment of coverage. While coverage is provided by an authoritative payer that directly supports a member's insurance policy, many organizations replicate coverage details to support their business workflows. Evaluation of each organization's reflection of coverage for a same individual often reveals areas of misalignment on coverage details that result in confusion for patients and partners. Misalignment categories include: (i) inactive coverage-organization(s) believe a member/patient has coverage, but the coverage is inactive, (ii) incorrect coverage-organization(s) have incorrect coverage details that differ from the payer providing the insurance policy, (iii) missing coverage-organization(s) are missing coverage for a member or patient record, where active coverage exists, and (iv) conflicting coverage-organization (s) show conflicting insurance priority for same person coverage. FIG. 2 shows examples 200 of coverage misalignments. In a first scenario type for conflicting coverage 202, a payer 210 and a provider 216 agree regarding primary coverage, but conflict regarding secondary coverage with a payer 212. In a second scenario type for inactive coverage 204, the payer 210 shows that the payer 214 still provides active coverage, while the payer 214 and the provider 216's records show that the payer 214's coverage is inactive indicating that the payer 210 may now be primary rather than secondary. In a third scenario type for incorrect coverage 206, the payer 210, the payer 212 each show correct coverage, but the provider 216 shows incorrect coverage (incorrect identifier, and a high-deductible plan versus a PPO plan). In another scenario type for missing coverage 208, whereas the payer 212 and a provider 218 each show a primary and secondary coverage, the provider 216 and the payer 210 are missing the secondary coverage. There are various contributors to these misalignments: timely access to up-to-date coverage is not available, operator errors in consuming and applying coverage details, qualifying life-events that result in coverage changes outside of an enrollment period, large scale coverage changes in the months following annual enrollment periods, and inadequate data or improper evaluation of coordination of benefits.

Other coverage misalignment contributors include the following examples. A member's coverage for a payer may become inactive, due to no longer meeting policy qualifications. The member may not be aware their coverage qualifications have resulted in lapsed coverage. A member's coverage for a payer may become inactive, due to a failure to pay premiums). The member may not notify the provider that their coverage is no longer in effect. A member's coverage for a payer may become inactive such as the aging out as an eligible beneficiary. The member may not know or may not notify the provider that their coverage is no longer in effect. A member's coverage for a payer may become inactive due to a change in employment. The member (dependent) may not make the provider aware the policy is no longer active. A member's coverage may become inactive due to disqualified coverage: The member may not be aware their coverage qualifications have resulted in lapsed coverage. A member may have more than one coverage, but not notify a provider of all available coverage. A member may share incorrect or no-longer-applicable coverage information to a provider. A member might be unaware they are covered as a beneficiary on another policy (parent, step-parent, spouse). The payer providing coverage for a dependent on the policy may be unaware the other payer beneficiary coverage has termed, resulting in a potentially incorrect benefits order. A payer may have inadequate or incorrect other-payer information to establish proper insurance priority, or a payer may make an incorrect decision when contemplating COB criteria. A payer participating in a healthcare network may not be aware that their member's coverage for a payer not participating in the healthcare network has become inactive where the coverage effective date has expired.

To address at least some of the problems described above, the example coverage alignment techniques described herein can be used to review each active and inactive insurance coverage associated with a member or patient as provided by network participants. In some implementations, an application's examination criteria determines if there is any misalignment on captured data between one or more participants that provide services for same individual. For example, do each payer and provider have the most current details of a person's coverage detail? Does a provider know about active coverage that another provider or payer does not know? Does a payer know about a coverage that another payer or provider does not know? Are all recorded payer coverage policy details correct, complete, and exact where required? Does a payer or provider reflect active coverage when coverage is no longer effective? Do payers and providers who service the same individual all align on insurance priority?

Participant organizations identify and remediate differences in patient or member information prior to and at point of care. Participant organizations identify and remediate differences in patient/member information prior to and at point of care. To address inactive coverage, participant organizations may create or close coverage records. To address incorrect coverage, participant organizations may find and fix incorrect coverage data elements. To address missing coverage, participant organizations create coverage records. To address conflicting coverage, participant organizations find and fix insurance priority misalignments. In this way, the system according to the techniques described herein prevent and/or reduce denials, takebacks, balance billing, untimely filing, and/or write-offs.

Figure 3:
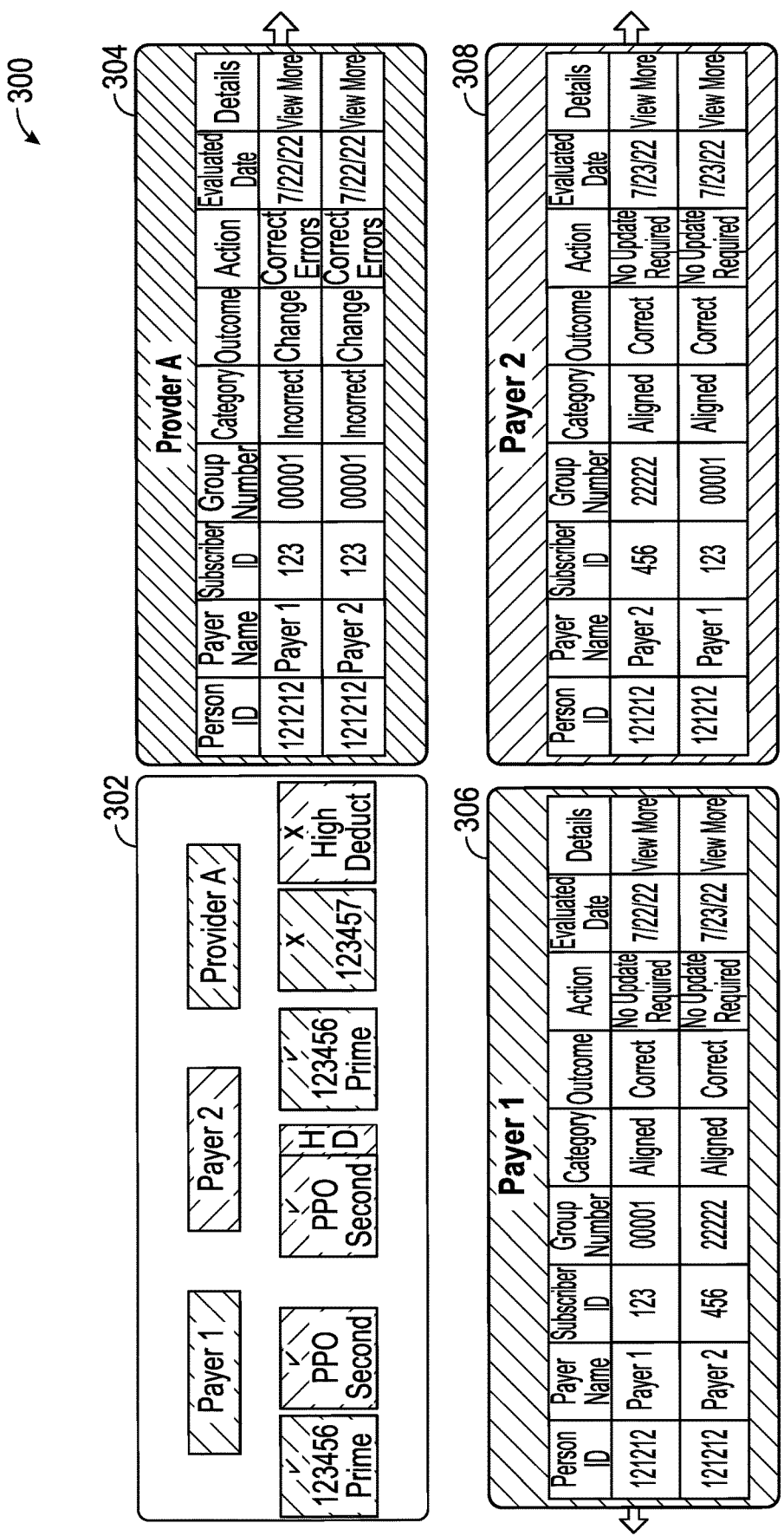
FIG. 3 shows an example user work queue for coverage alignment, according to some implementations.

FIG. 3 shows an example user work queue 300 for coverage alignment, according to some implementations. Each participant with knowledge of the same person can view their own and other participant results in a distributed ledger (sometimes referred to as the coverage ledger or the aggregate), access a same replicated view of the coverage ledger, and/or view participant progress on remediating misalignment. The example shows a view 302 that shows coverage information at a payer 1, coverage information at a payer 2 and coverage information at a provider A. The payer 1 shows a primary coverage with a coverage identifier, and a secondary PPO coverage. The payer 2 shows the secondary PPO coverage, but with a high deductible information, and the same primary coverage as the first payer. The provider A shows an incorrect coverage identifier and missing coverage information for the secondary coverage. The example also shows a view 304, a view 306 and a view 308, of the distributed ledger at the provider A, at the payer 1, and at the payer 2, respectively. The ledger includes a column for a person identifier, which is shared amongst the provider, and the payers. The ledger also includes a payer name, a subscriber identifier, a group number, a category (e.g., whether the data is aligned or incorrect), an outcome (whether the data is correct or needs a change), and action to be taken (correct errors, if the category is incorrect and outcome is to change, and no update required, otherwise), an evaluation date, and/or links to any details. Using the data in the ledger, the payers and/or the provider may evaluate alignment and/or initiate corrective actions for correcting misalignments.

Example Coverage Data

In some implementations, coverage includes authoritative coverage when a participant sources coverage for an insurance policy they provide, and non-authoritative coverage when a participant sources a copy of coverage acquired from an authoritative payer. Coverage may correspond to participating payers or non-participating payers. For active accounts, payers typically include payers for current active coverage per policy effective dates, and providers include healthcare providers for open and closed encounters with active coverage per policy effective dates. For inactive accounts, payers typically include payers for accounts that have been inactive for a year per policy effective dates, and providers typically include providers for open and closed encounters with inactive coverage (inactive for at least a year, per policy effective dates). In some implementations, coverage updates are triggered (i) whenever any field is updated, (ii) within a maximum of 24 hours of a coverage change, and/or (iii) if updates are applied in batches, by changes to a landing zone, no later than a predetermined time of day (e.g., 7 am EST).

Example Coverage Resource Specifications

In some implementations, participants provide a coverage resource for members or patients, as specified via coverages, status, period, specifications described below. Coverages can include authoritative coverage, other payer coverage. Participants can provide a coverage resource for each payer coverage associated with a member or patient (both authoritative and non-authoritative). Authoritative coverage includes where the participant is providing a coverage resource for an insurance policy they provide. Authoritative coverage is only ever associated with a payer. Non-authoritative coverage includes where the participant is providing a 'copy' of coverage acquired from an authoritative payer. Providers only ever provide non-authoritative coverage, as a provider. This is sometimes referred to as other payer data. If a participant is aware of two coverages for a member or patient, a participant will provide two coverage resources for that member.

Status period may be for active coverages or inactive coverages. Status period may cover a last year. Participants will provide a coverage resource for each member or patient with an active payer coverage. Payer sources all current active coverage (per policy effective dates), and provider sources all open and closed encounters with active coverage (per policy effective dates). Participants will provide a coverage resource for each member or patient with inactive payer coverage where policy effective end date is within one year of the current date. Payer sources coverage resource for 1 year inactive (per policy effective dates), and provider sources all open and closed encounters with inactive coverage (1 year) (per policy effective dates).

In some implementations, updates include daily delta update file. In some implementations, participants send a coverage resource update each time a member or patient coverage has any field updated. In some implementations, coverage updates are provided by participants within a maximum of 24 hours of a coverage change. In some implementations, participants providing coverage on a batch basis distribute coverage resource updates to their landing zones no later than a particular time of the date (e.g., 7 am EST).

Inactive coverage records provided by payers are those coverage records where a member's coverage has terminated within the past 12 months. Inactive coverage records provided by providers are those coverage records where the patient has had an encounter within the past 12 months.

There are many occurrences where a provider is unaware that a patient's coverage is no longer active. When a participating payer sources their inactive coverage, it allows a provider to ensure they have the most up to date coverage information for a patient so that an incorrect bill is not issued to the carrier. There are many occurrences where a provider may represent a patient coverage as inactive, where the coverage has renewed and is currently active. When a participating payer sources their inactive coverage, it allows a provider to ensure they have the most up to date active coverage details at patient registration. There are many occurrences where a patient has had more than one coverage. The provider is often aware that Coverage A is no longer active, before the carrier for Coverage B is aware Coverage A is no longer active. When a participating provider sources their inactive coverage, it allows a payer to ensure they have the most up to date knowledge of active coverages for a member.

There are many occurrences where a provider is not aware that a patient has more than one coverage. When a participating payer sources their knowledge of other payer coverage (Payer ID, Payer Name, Plan ID, Plan Name, Effective Dates), it allows a provider to ensure they have knowledge of all known coverages for a patient. There are many occurrences where a payer is not aware that a member has more than one coverage. When a participating provider sources their knowledge of other payer coverage (Payer ID, Payer Name, Plan ID, Plan Name, Effective Dates), it allows a payer to ensure they have knowledge of all known coverages for a patient and allows the Payer to evaluate the potential impact upon insurance priority order.

The data described above can help support a provider's ability to obtain a real-time prospective coverage update, whereby the provider does not have to issue a request and receive a response in order to obtain the most up to date available coverage information for a patient/member. The data can also be used to support the coverage application's ability to evaluate multi-participant coverage to determine if there is coverage misalignment between any two or more participant's current capture of known coverage, so that participants can recognize a reduced number of transactions required to support clean claiming and payment workflows. The data also can be used to supports Coordination of Benefits (COB) use cases with the coverage data necessary to make a rules based determination on insurance priority when a member has more than one known associated coverage.

In some implementations, coverage data provided by a participant to their private cloud environment is only ever accessible to another participant in the following situations: where another participant has provided coverage data for the same individual as identified by a common network identifier; where permissions are evaluated that allow for the notification between participants that there is available coverage information for the same individual. Permission terms include each participant has provided coverage data for the same individual, each participant is subscribed to the same application, the individual's available data resources (coverage) represent the resources required by the application both participants are subscribed to, each participant has indicated consent to exchange coverage data with other participants who have subscribed to the same application, data is only ever accessible between participants after system-controlled terms and permissions are evaluated and satisfied, with the permissioned access of coverage data; one participant does not know another participant is participating in an network solution; one participant does not know what data resource types another participant is providing to the network; one participant does not know how many member or patient coverage records another participant has provided to their private cloud environment; one participant does not know what members or patients are represented in coverage records that have been provided by another participant; one participant payer will only have access to a limited amount of coverage data details provided by another payer participant (data determined to be necessary for supporting Coordination of Benefits evaluation and determination). Payer and provider participants only have access to limited coverage data details associated with known coverage for non-participating payers (data determined to be necessary for supporting coordination of benefits evaluation and determination). Providers will have access to all coverage data details provided from participating payers. Payers have access to all coverage data details provided from participating payers for the coverage they provide to the shared member/patient.

In some implementations, this data is not used for any other purpose than support of the coverage alignment solution. Within the network, application subscription contracted terms of use are reflected in the Authorization Service. These terms restrict the sharing of coverage data to only network participants that are (actively) subscribed to the same solution, restrict the sharing of coverage data to only network participants who service the same individual. The systems do not share information with other network participants for data resource types not associated with the application each participant is subscribed to. Where there is a user interface that allows organization users to access coverage data that has been shared between organizations on the network services permissioned basis. Organizations have to establish user access via a standardized application-level authentication tooling. Organization users coverage record access activity is logged and a Health Insurance Portability and Accountability Act (HIPAA) acceptable use audit entries of access data is available for each participating organization. Organizations will be given the opportunity to credential User Interface users through their enterprise active directory to allow an additional measure of access controls. Outside of the network, each coverage Application participant will sign an application subscription agreement with terms that designate the data usage purpose and limitations. Coverage data processing result in the follow modifications to the data from its originally provided state. Coverage data is supplemented with an network or person ID defining a single network person identifier. Some field content in the coverage data set can be normalized to a Network standard to allow for coverage comparison. For example, if Participant A uses 01, 02, 03 to designate Relationship Status and Participant B uses S, M, F, C to designate Relationship Status. These field values may be normalized to reflect a network standard such as Self, Mother, Father, Child. In some implementations, Mirth Connect transforms the coverage data into a common FHIR resource standard.

In some implementations, coverage data processing results in the follow modifications to the data from its originally provided state. The full breadth of the participant provided coverage data is stored in an AWS S3 bucket within the participant's own controlled private cloud instance. The full breadth of the participant provided coverage data is stored in a FHIR Server within the participant's own control private cloud instance. Demographic data elements are encrypted using SHA256 irreversible hashing. This demographic information used for identity matching can be stored in a private cloud instance identity matching service, as well as by any business associate. This demographic information is indiscernible to any person who might access this data for maintenance and support reasons. The unique ID (sometimes referred to as a person identifier or a network identifier), data type, and FHIR Server URLs associated with the FHIR Server data storage location are stored in the private cloud instance data index service. The full breadth of the participant provided coverage data is stored in the coverage application database that resides within the participant's own controlled private cloud instance. A limited amount of participant provided coverage data is exchanged between participants, where there is a person identifier relationship, and stored in a landing zone coverage application data stores. This data is evaluated against other coverage records to determine alignment issues and presented to business end-users for purposes of remediating misalignment problems.

Example purposes for beneficiary data are shown in the following table, according to some implementations.

| Data Group | Field Name | Description |
| --- | --- | --- |
| Beneficiary Identifiers | Medical Record Number | Used by the Identity Matching Service for record matching (when a participant updates a record, as well as between participants who service the same individual) |
| | Beneficiary ID | Used to ensure Provider has up-to-date and correct Coverage details to avoid denials |
| | SSN | Used by the Identity Matching Service for record matching |
| Beneficiary Demographics | Relationship Status | Used to support COB determination. Used for Provider data accuracy |
| | Last Name | Used by the Identity Matching Service for record matching. Used for Provider data accuracy |
| | First Name | Used by the Identity Matching Service for record matching. Used for Provider data accuracy |
| | Middle Name | Used by the Identity Matching Service for record matching. Used for Provider data accuracy |
| | Name Prefix | Used by the Identity Matching Service for record matching. Used for Provider data accuracy |
| | Name Suffix | Used by the Identity Matching Service for record matching. Used for Provider data accuracy |
| | Date of Birth | Used by the Identity Matching Service for record matching. Used for Provider data accuracy |
| | Gender | Used by the Identity Matching Service for record matching. Used for Provider data accuracy |
| | Marital Status | Used for Payer and Provider data accuracy |

-continued

| Data Group | Field Name | Description |
| --- | --- | --- |
| Beneficiary Address | Address Line 1 | Used for Payer and Provider data accuracy |
| | Address Line 2 | Used for Payer and Provider data accuracy |
| | City | Used for Payer and Provider data accuracy |
| | State | Used for Payer and Provider data accuracy |
| | Zip Code | Used for Payer and Provider data accuracy |
| | Country | Used for Payer and Provider data accuracy |
| Beneficiary Communication | Home Phone | Used for Payer and Provider data accuracy |
| | Mobile Phone | Used for Payer and Provider data accuracy |
| | Email | Used for Payer and Provider data accuracy |

Example purposes for subscriber are shown in the following table, according to some implementations. In some implementations, if subscriber and beneficiary are the same person, set relationship status to be "Self" in the Beneficiary Data field, and Subscriber Identifiers, Subscriber Demographics, Subscriber Address, and Subscriber Communication sections can be left blank. If subscriber and beneficiary are different people, populate all below fields.

| Data Group | Field Name | Description |
| --- | --- | --- |
| Subscriber Identifiers | Subscriber ID | Used for Provider data accuracy |
| Subscriber Demographics | Subscriber Last Name | Used for Provider data accuracy |
| | Subscriber First Name | Used for Provider data accuracy |
| | Subscriber Middle Name | Used for Provider data accuracy |
| | Subscriber Name Prefix | Used for Provider data accuracy |
| | Subscriber Name Suffix | Used for Provider data accuracy |
| | Subscriber Date of Birth | Used for Provider data accuracy |
| | Subscriber Gender | Used for Provider data accuracy |
| | Subscriber Marital Status | Used for Payer and Provider data accuracy |
| Subscriber Address | Subscriber Address Line 1 | Used for Payer and Provider data accuracy |
| | Subscriber Address Line 2 | Used for Payer and Provider data accuracy |
| | Subscriber City | Used for Payer and Provider data accuracy |
| | Subscriber State | Used for Payer and Provider data accuracy |
| | Subscriber Zip Code | Used for Payer and Provider data accuracy |
| | Subscriber Country | Used for Payer and Provider data accuracy |
| Subscriber Communication | Subscriber Home Phone | Used for Payer and Provider data accuracy |
| | Subscriber Mobile Phone | Used for Payer and Provider data accuracy |
| | Subscriber Email | Used for Payer and Provider data accuracy |

Example purposes for coverage data are shown in the following table, according to some implementations.

| Data Group | Field Name | Description |
| --- | --- | --- |
| Payer | Payer ID | Used for mapping to support solution data comparison |
| | Payer Name | Used for mapping to support solution data comparison |
| Plan | Plan ID | Used for mapping to support solution data comparison |
| | Plan Name | Used for mapping to support solution data comparison |
| | Product Type | Used to support COB determination. Used for Provider data accuracy |
| | Policy Type | Used for Provider data accuracy |
| | Policy Number | Used to support COB determination. Used for Provider data accuracy |
| Coverage | Coverage ID | Used for Provider data accuracy |
| | Coverage Type | Used to support COB determination. Used for Provider data accuracy |
| | Coverage Status | Used for Payer and Provider data accuracy |
| | Coverage Effective Date | Used for Payer and Provider data accuracy |
| | Coverage End Date | Used for Payer and Provider data accuracy |
| | Coverage Group Number | Used for Provider data accuracy |
| | Coverage Group Name | Used for Provider data accuracy |
| | Order | Used to support COB determination. Used for Provider data accuracy |
| | Group Size Indicator | Used to support COB determination |
| Other Coordination | Legally Responsible Guardian | Used to support COB determination |
| | Beneficiary Work Status | Used to support COB determination |

-continued

| Data Group | Field Name | Description |
|---|---|---|
| | Beneficiary Entitlement | Used to support COB determination |
| | Beneficiary Retirement Date | Used to support COB determination |
| | Beneficiary Date of Disability | Used to support COB determination |
| | Beneficiary ESRD Coordination Period Start Date | Used to support COB determination |
| | Beneficiary ESRD Coordination Period End Date | Used to support COB determination |

An example table for beneficiary data is shown below, according to some implementations.

| Data Group | Field Name | Data Type | Required | Description |
|---|---|---|---|---|
| | Coverage Record ID | String | Yes | Participant unique identifier for this coverage record. Updates to a coverage record must use the previously provided Coverage Record ID |
| Beneficiary Identifiers | Medical Record Number | String | Yes | Indicates medical record number of a patient |
| | Beneficiary ID | String | Yes | Indicates beneficiary ID under which member covered |
| | SSN | String | Yes | Indicates Social Security Number of the beneficiary |
| Beneficiary Demographics | Relationship Status | String | Yes | Indicates the relationship status/code of the member/beneficiary with the subscriber (i.e., self, child, spouse). |
| | Last Name | String | Yes | Indicates surname of the beneficiary |
| | First Name | String | Yes | Indicates the first name of the beneficiary |
| | Middle Name | String | Yes | Indicates middle name of the beneficiary |
| | Name Prefix | String | Yes | Indicates the prefix on the name of the beneficiary |
| | Name Suffix | String | Yes | Indicates the suffix on the name of the beneficiary |
| | Date of Birth | Date | Yes | Indicates birthdate of the beneficiary |
| | Gender | String | Yes | Indicates text or code for gender of the beneficiary |
| | Marital Status | String | Yes | Indicates the marital (civil) status of the beneficiary |
| Beneficiary Address | Address Line 1 | String | Yes | Indicates first line of primary home address of the beneficiary |
| | Address Line 2 | String | Yes | Indicates second line of primary home address of the beneficiary |
| | City | String | Yes | Indicates address city of the beneficiary |
| | State | String | Yes | Indicates address state of the beneficiary |
| | Zip Code | String | Yes | Indicates address postal code of the beneficiary |
| | Country | String | Recommended | Indicates address country of the beneficiary |
| Beneficiary Communication | Home Phone | String | Recommended | Indicates the home telephone number of the beneficiary |
| | Mobile Phone | String | Recommended | Indicates the personal mobile number of the beneficiary |
| | Email | String | Recommended | Indicates the official email address of the beneficiary |

An example table for subscriber data is shown below, according to some implementations. If subscriber and beneficiary are the same person, relationship status may be set to "Self" in the Beneficiary Data field, and Subscriber Identifiers, Subscriber Demographics, Subscriber Address, and Subscriber Communication sections can be left blank. If subscriber and beneficiary are different people, all fields are populated.

| Data Group | Field Name | Data Type | Required | Description |
| --- | --- | --- | --- | --- |
| Subscriber Identifiers | Subscriber ID | String | Yes | Indicates subscriber ID under which member covered |
| Subscriber Demographics | Subscriber Last Name | String | Yes | Indicates surname of the subscriber |
|  | Subscriber First Name | String | Yes | Indicates the first name of the subscriber |
|  | Subscriber Middle Name | String | Yes | Indicates middle name of the subscriber |
|  | Subscriber Name Prefix | String | Yes | Indicates the prefix on the name of the subscriber |
|  | Subscriber Name Suffix | String | Yes | Indicates the suffix on the name of the subscriber |
|  | Subscriber Date of Birth | Date | Yes | Indicates birthdate and time of the subscriber |
|  | Subscriber Gender | String | Yes | Indicates text or code for gender of the subscriber |
|  | Subscriber Marital Status | String | Yes | Indicates the marital (civil) status of the subscriber |
| Subscriber Address | Subscriber Address Line 1 | String | Yes | Indicates first line of primary home address of the subscriber |
|  | Subscriber Address Line 2 | String | Yes | Indicates second line of primary home address of the subscriber |
|  | Subscriber City | String | Yes | Indicates address city of the subscriber |
|  | Subscriber State | String | Yes | Indicates address state of the subscriber |
|  | Subscriber Zip Code | String | Yes | Indicates address postal code of the subscriber |
|  | Subscriber Country | String | Recommended | Indicates address country of the subscriber |
| Subscriber Communication | Subscriber Home Phone | String | Recommended | Indicates the home telephone number of the subscriber |
|  | Subscriber Mobile Phone | String | Recommended | Indicates the personal mobile number of the subscriber |
|  | Subscriber Email | String | Recommended | Indicates the email address of the subscriber |

An example table for coverage data is shown below, according to some implementations. The table includes coverage data detail required to determine coordination of benefits via COB determinative rules.

| Data Group | Field Name | Data Type | Required | Description |
| --- | --- | --- | --- | --- |
| Payer | Payer ID | String | Yes | Indicates Insurance identification number for payer |
|  | Payer Name | String | Yes | Indicates the name of the organization (i.e., payer name, employer name, facility name, provider organization) |
| Plan | Plan ID | String | Yes | Used for mapping to support solution data comparison |
|  | Plan Name | String | Yes | Used for mapping to support solution data comparison |
|  | Product Type | String | Yes | Indicates the type of plan-product under which member enrolled (i.e., HMO, PPO, POS) |
|  | Policy Type | String | Yes | Indicates the type of policy purchased from insurance (i.e. ASO, FI) |
|  | Policy Number | String | Yes | Indicates the identification number assigned to the policy |
| Coverage | Coverage ID | String | Yes | Indicates a unique identifier for the Coverage record |

| Data Group | Field Name | Data Type | Required | Description |
|---|---|---|---|---|
| | Coverage Type | String | Yes | Indicates the type of coverage for which policy purchase (i.e., Medical, Dental, Vision) |
| | Coverage Status | String | Yes | Indicates the status of coverage plan. (i.e., active, cancelled) |
| | Coverage Effective Date | Date | Yes | Indicates the date when coverage is effective for patient |
| | Coverage End Date | Date | Yes | Indicates the date when coverage ends for patient |
| | Coverage Group Number | String | Yes | Indicates identification number assigned to the group for which the policy is define/purchased |
| | Coverage Group Name | String | Yes | Indicates name of the group for which the policy purchased |
| | Order | String | Yes | Indicates the order of insurance priority defined for the patient |
| | Group Size Indicator | String | Yes | Indicates the group size information for which the policy purchase |
| Other Coordination | Subscriber Legally Responsible Guardian | Boolean | Yes | Indicates whether subscriber is the legally responsible for the beneficiary |
| | Subscriber Work Status | Boolean | Yes | Indicates employment status of subscriber |
| | Beneficiary Entitlement | String | Yes | Indicates Medicare Entitlement for the patient/beneficiary |
| | Beneficiary Retirement Date | Date | Yes | Indicates patient/beneficiary retirement date |
| | Beneficiary Date of Disability | Date | Yes | Indicates injury date or disability period of patient/beneficiary |
| | Beneficiary ESRD Coordination Period Start Date | Date | Yes | Indicates the End-Stage Renal Disease (ESRD) treatment start date of patient/beneficiary |
| | Beneficiary ESRD Coordination Period End Date | Date | Yes | Indicates the End-Stage Renal Disease (ESRD) treatment end date of patient/beneficiary |

Example Data Structure

Figure 4A:
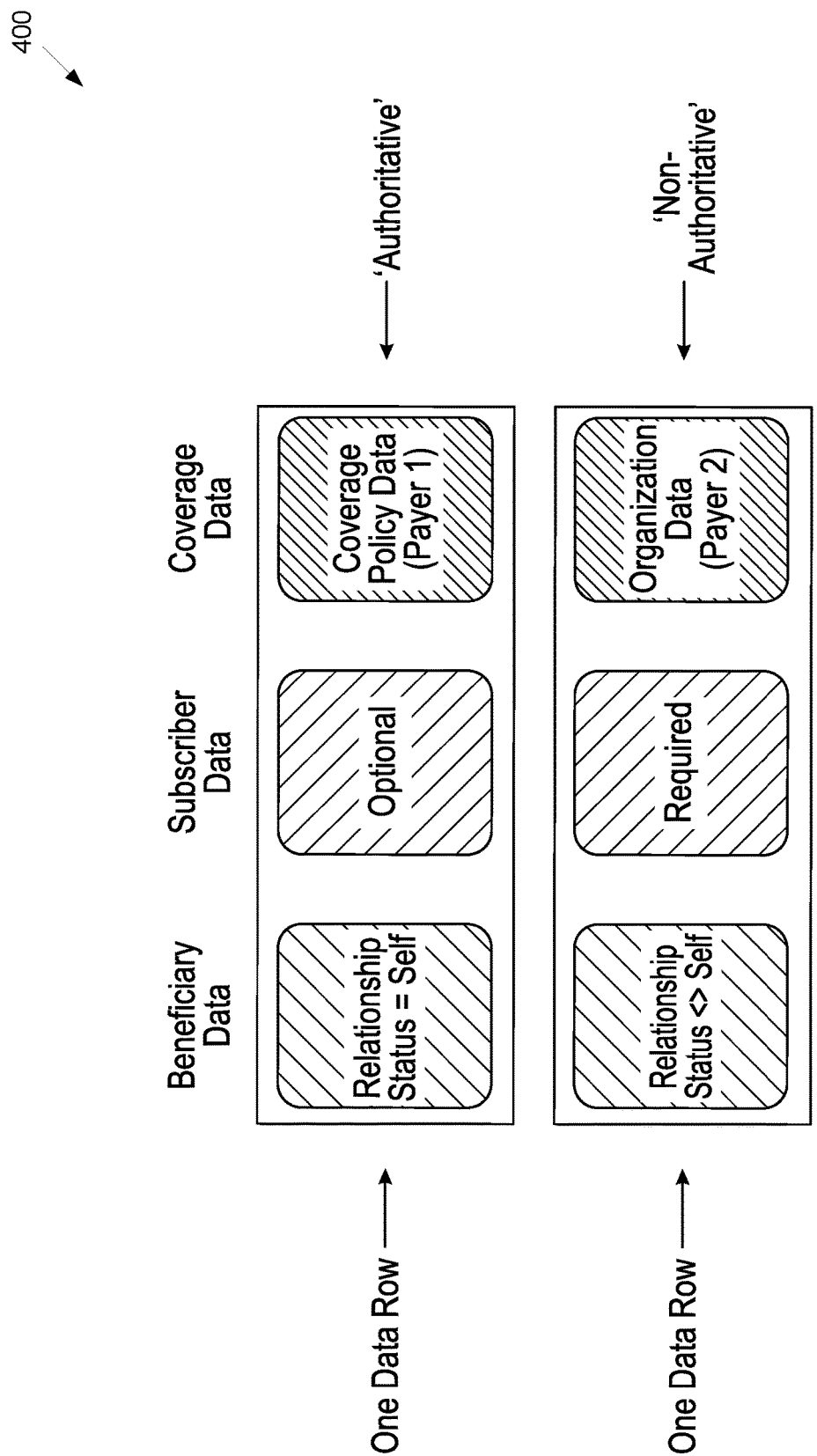
FIG. 4A shows a schematic diagram of an example data structure for a payer, according to some implementations.

FIG. 4A shows a schematic diagram of an example data structure 400 for a payer, according to some implementations. Payer 1 provides coverage for member (John Smith). Payer 1 sends a coverage resource consisting of three data groups: beneficiary, subscriber, and coverage. Payer 1 sends a coverage resource for each known coverage for a member. If Payer 1 knows John Smith has coverage through another payer (Payer 2), they will send two coverage resources-one for the Payer 1 coverage (authoritative as the policy is provided by Payer 1), and one for Payer 2 coverage (non-authoritative as it is a coverage copy of a policy that is not provided by Payer 1). If a payer is sending data in a CSV format, a single row will consist of the beneficiary, subscriber, and coverage data.

Figure 4B:
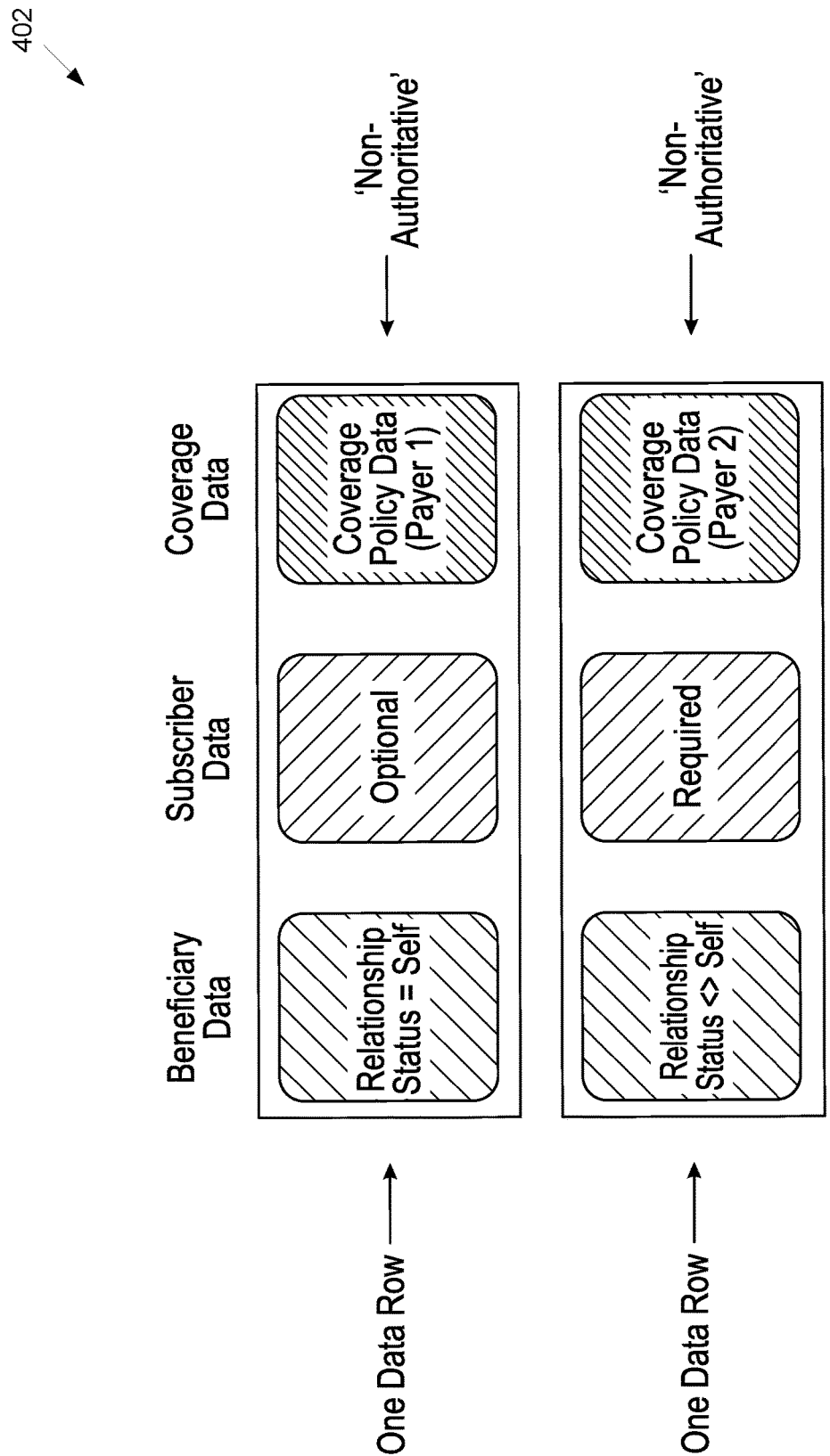
FIG. 4B shows a schematic diagram of an example data structure for a provider, according to some implementations.

FIG. 4B shows a schematic diagram of an example data structure 402 for a provider, according to some implementations. For a Patient (John Smith), a provider (Provider A) sends a coverage resource consisting of three resources: beneficiary, subscriber, and coverage. Provider A sends a coverage resource for each known coverage for all patients. If Provider A knows John Smith has coverage through Payer 1 and Payer 2, they will send two coverage resources-one for the Payer 1 coverage (non-authoritative as it is a coverage copy), and one for Payer 2 coverage (non-authoritative as it is a coverage copy). If a provider is sending data in a CSV format, a single row will consist of the beneficiary, subscriber, and coverage data.

Figure 4C:
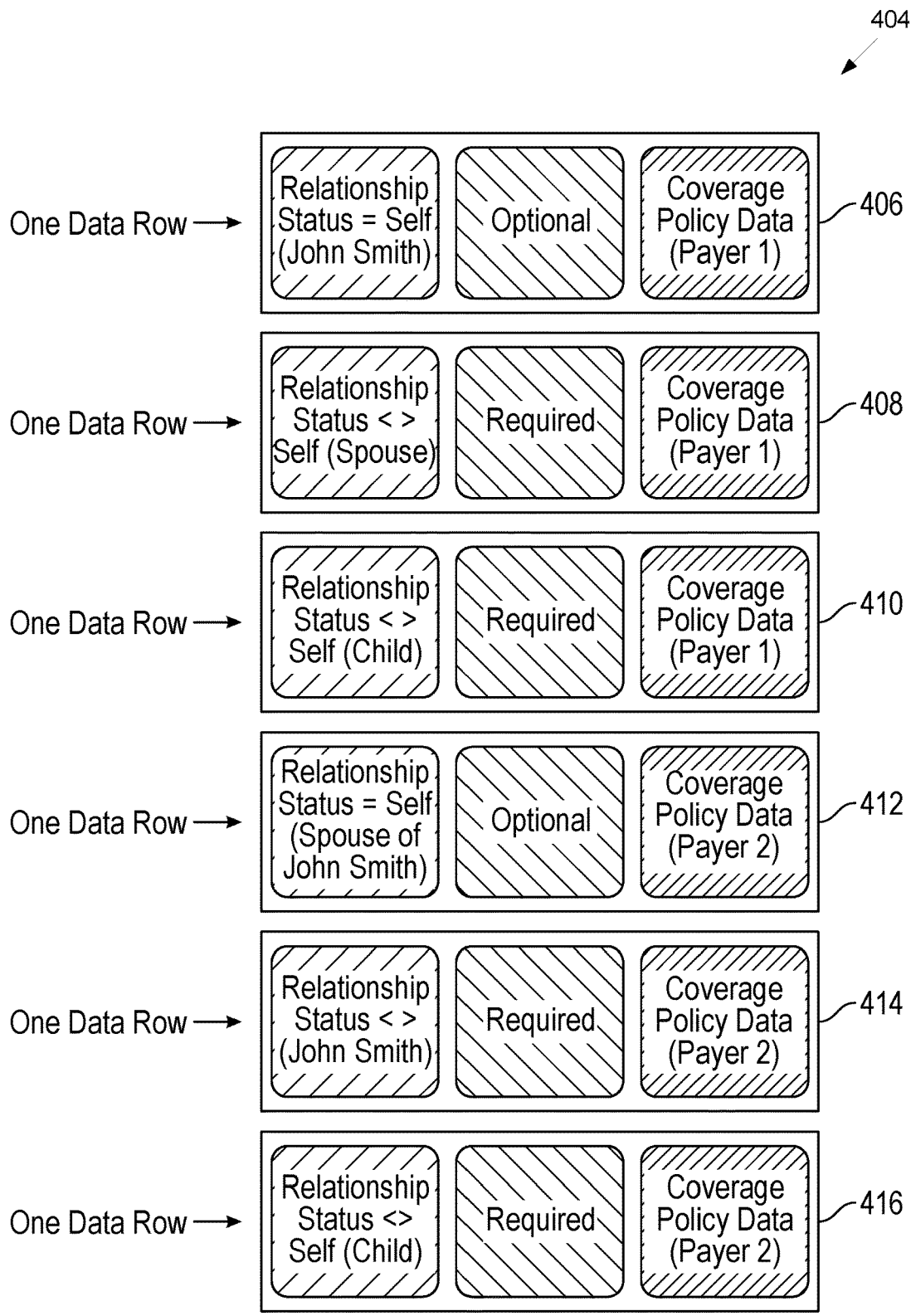
FIG. 4C shows a schematic diagram of an example coverage data, according to some implementations.

FIG. 4C shows a schematic diagram of an example coverage data 404, according to some implementations. A member (John Smith) is the subscriber for a Payer 1 plan, corresponding to a data row 406. John Smith's spouse and child are enrolled as beneficiaries in the same Payer 1 plan, corresponding to data rows 408 and 410, respectively. John Smith's spouse is the subscriber for a Payer 2 plan, corresponding to a data row 12. John Smith and the child are enrolled as beneficiaries in the Payer 2 plan, corresponding to data rows 414 and 416, respectively. Payer 1 will send a coverage resource for each known coverage for each enrolled member (6 total coverage resources, each resource corresponding to a data row).

Figure 5:
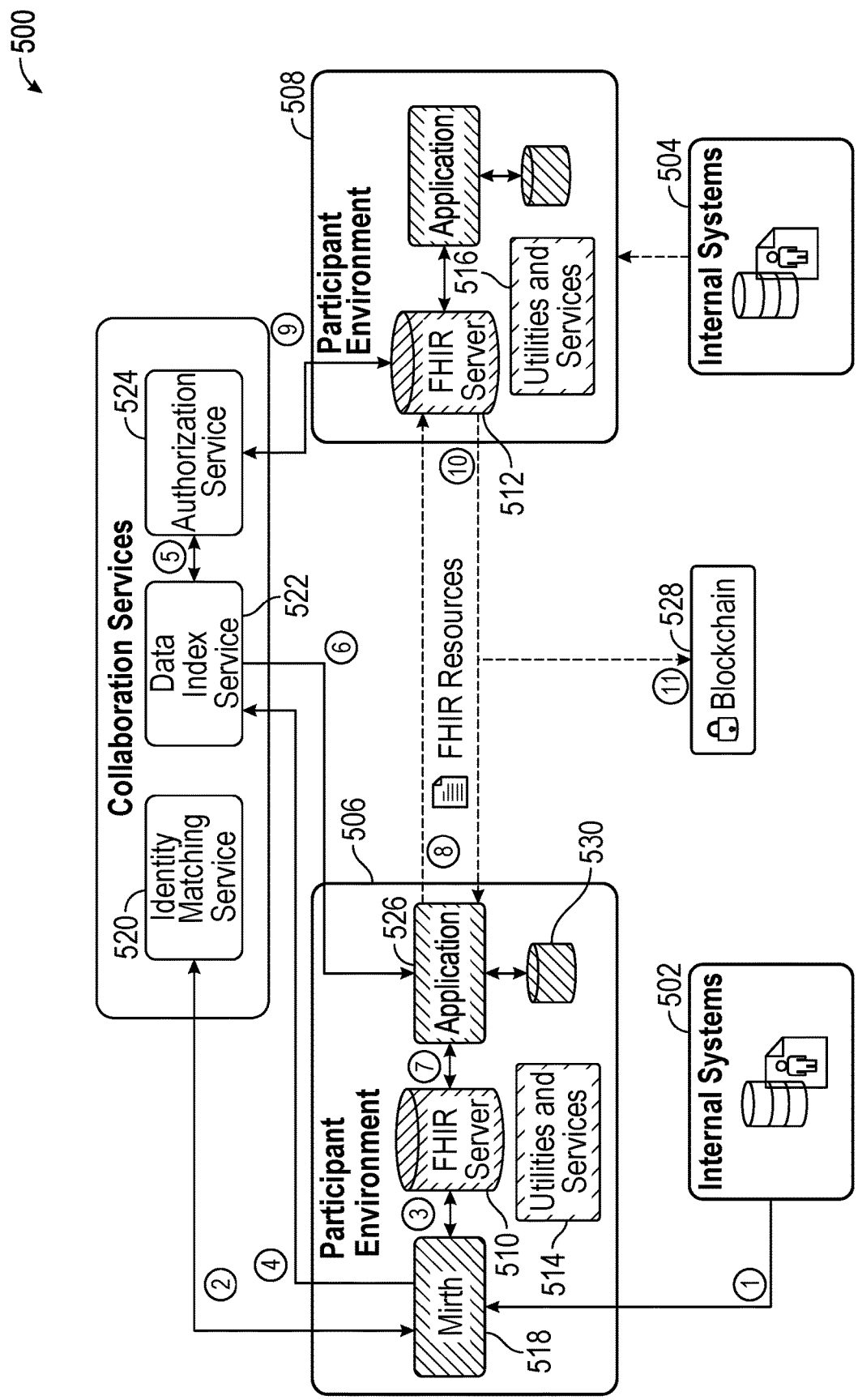
FIG. 5 shows a schematic diagram of an example network data flow, according to some implementations.

FIG. 5 shows a schematic diagram of an example network data flow 500, according to some implementations. Each participant (provider or payer, e.g., internal systems 502 and 504) is connected to an environment (sometimes referred to as a landing zone) that includes a FHIR server for their data to be stored. For example, in FIG. 5, the internal system 502 is connected to a participant environment 506 that includes a FHIR server 510, and the internal system 504 is connected to a participant environment 508 that includes a FHIR server 512. In some implementations, each environment includes a pre-configured suite of utilities and services (e.g., utilities and services 514 and 516), which provide capabilities needed to develop and deploy solutions, as well as to subscribe and connect to other's solutions, from one location. In some implementations, each environment provides a single communication channel to an on-premises environment and data, creating a secure pathway for providing and standardizing data for persistence into a dedicated and isolated environment. In some implementations, each environment provides authentication controls for enforcing permissions and policy, for environment access, for data sharing, and for application-level interaction. In some implementations, each environment includes an array of tools to develop, deploy, and manage applications and services, to ensure that the environment is a full functioning managed space for both providing own, and subscribing to other's solutions. In some implementations, application-level tooling is provided in each environment to ensure a ready and connected state to manage data sharing traffic. In some implementations, each environment includes monitoring utilities for full knowledge of transactional data events and history, allowing tracking of data requests, origin of requests, who data is shared with, and when it was shared.

In step (1), participants submit their coverage data to their environment, via push or pull integration with their Mirth Connect instance (e.g., Mirth Connect 518). In step (2), Mirth Connect extracts a small subset of person identity information, such as name, date of birth, all or part of a social security number, and/or current address, from the coverage resource and sends to an identity matching service 520 to establish a person identifier. Mirth Connect associates the person identifier with the coverage resource. In step (3), a Mirth Connect channel is established that uses a map to convert the file or API-based coverage resource in a FHIR resource bundle. The FHIR-based coverage resource is loaded to the participant's protected machine's FHIR server. Mirth Connect records the FHIR server URL resource locations for the coverage resource contents. In step (4), Mirth Connect sends the coverage resource URLs and associated coverage resource shared identifier to a data index service 522. The data index service 522 registers the coverage resource resources so they can become discoverable. In step (5), the data index service 522 identifies other coverage resources provided by other participants with a shared person identifier. The data index service 522 confirms with a authorization service 524 if is appropriate to notify each participant with shared knowledge of a person identifier about available resources. The authorization service 524 reflects contractual terms indicating what participants are subscribed to what solutions and what data resource types those solutions necessitate. The authorization service 524 verifies the data sharing request from the data index service 522 and notifies the data index service 522 if information sharing between participants is appropriate. In step (6), a coverage application 526 of a participant subscribes to the data index service's automated notification feature. Upon a positive confirmation from the authorization service 524, the data index service 522 notifies each participant application of the URL resource locations of the coverage data stored in each participant FHIR server. In step (7), the participant coverage application acquires their own organization's coverage resource from their own FHIR server (e.g., the application 526 acquires own coverage resource from the FHIR server 510). In step (8), one participant's coverage application issues a request to all other participant's (with a shared person identifier) FHIR server, where the request contains the other participant's FHIR server URLs for the requested coverage resource. For example, the application 526 issues a request to the FHIR server 512. In step (9), the participant (e.g., the participant environment 508) that received a request to share a coverage resource verifies sharing appropriateness with the authorization service 524. In step (10), the responding participant's FHIR server (e.g., the FHIR server 512) provides the coverage resource to the requesting participant's coverage application (e.g., the application 526). In step (11), the events associated with the coverage application's request, and the FHIR server response and sharing of the coverage resource are recorded to a blockchain (e.g., the blockchain 528). No actual protected health information (PHI) is stored on the blockchain; only a history of the data sharing events is stored. In some implementations, the authorization service 524 is invoked for all API calls. For example, the authorization service 524 is invoked when the Mirth Connect 518 calls the FHIR server 510 in a same participant environment, when the Mirth Connect 518 queries the data index service 522, when the Mirth Connect 518 queries the identity matching service 520, and/or when the coverage application 526 queries another participant environment.

Figure 6:
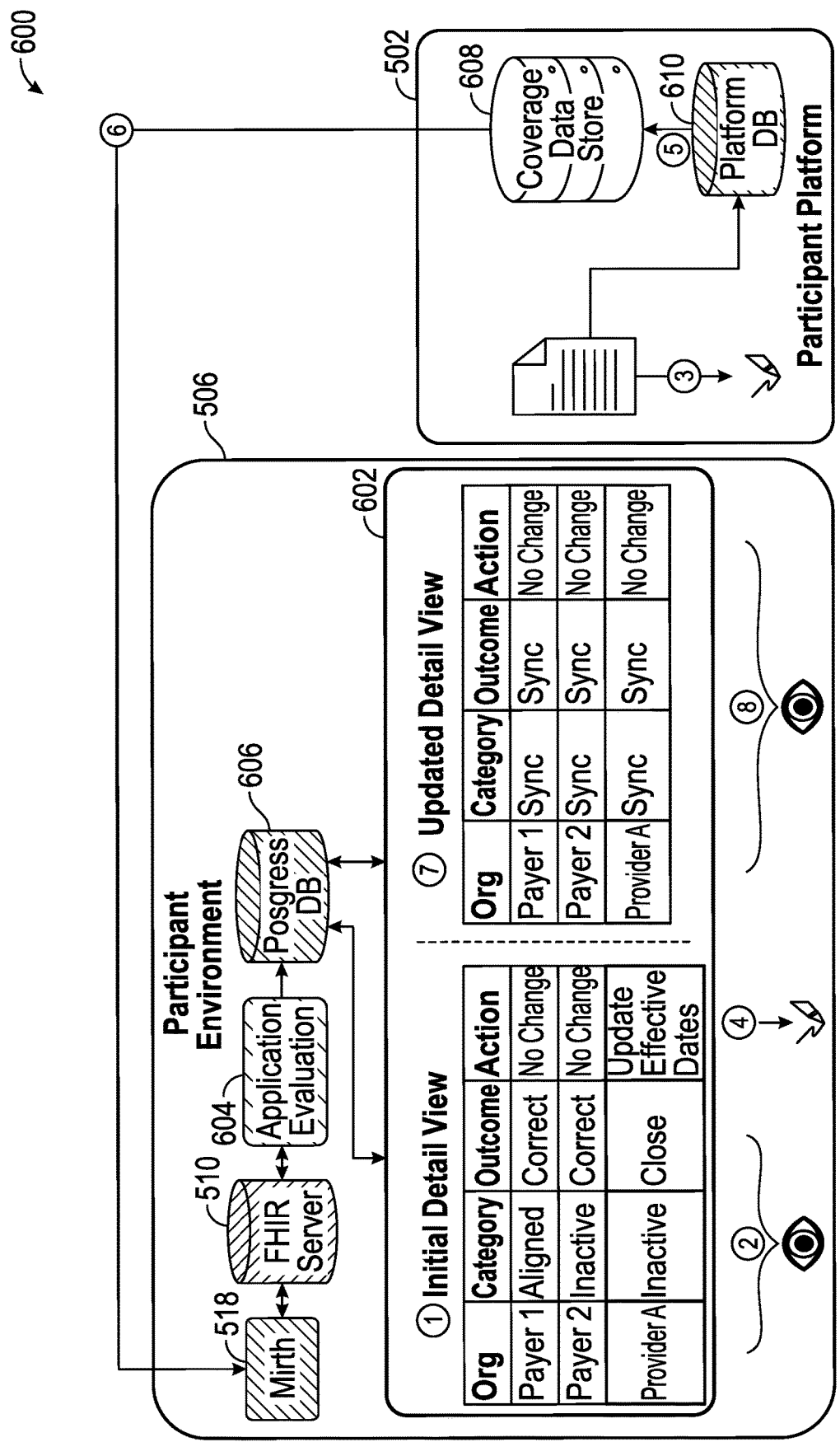
FIG. 6 shows a schematic diagram of an example application data flow, according to some implementations.

FIG. 6 shows a schematic diagram of an example application data flow 600, according to some implementations. After data is loaded into various participant's FHIR server, a coverage synchronization application 604 performs at least some of the steps described herein. In step (1), a user logs in to a coverage synchronization UI to access their work queue 602 (stored in a local database, such as PostgreSQL database 606, which is same as the database 530 and similarly populated). In the work queue, a user views coverage records submitted by their organizations. From the work queue, a user can select a coverage record to view coverage details that include coverage alignment review outcomes (e.g., Category, Outcome, Action) for each participant that provided coverage for a common user identifier (e.g., an identifier for a member or a patient). In step (2), the user (Provider A) views coverage details for each participant that assists the user to discern relevant data for understanding the recommended action and applying the recommend action in the source system. In step (3), the user makes necessary adjustments to a member or person record in the organizations source system. In step (4), the user records the action they took in the source system and in the coverage details UI. The user indicates if they applied the recommended action or took a different action or no action. If the user took a different action than was recommended by coverage synchronization (or took no action), the user applies a note documenting the discrepancy between the recommended action and the final determination made by the user. In step (5), where a user applied an update or change to the record in the organization's source system 610, the source system 610 provides an updated coverage resource to the participant's coverage data store 608. In step (6), the participant distributes the updated coverage resource to their environment's Mirth Connect instance (e.g., Mirth Connect 518) via their push or pull integration. In step (7), after applying an update or change to the coverage record in the participant source system, the user may choose to observe coverage record in the coverage synchronization UI details view. In step (8), where all participants have taken corrective measures and provided update coverage resources, the user has access to all participant's coverage in a synchronized status (Category and Outcome).

Figure 7:
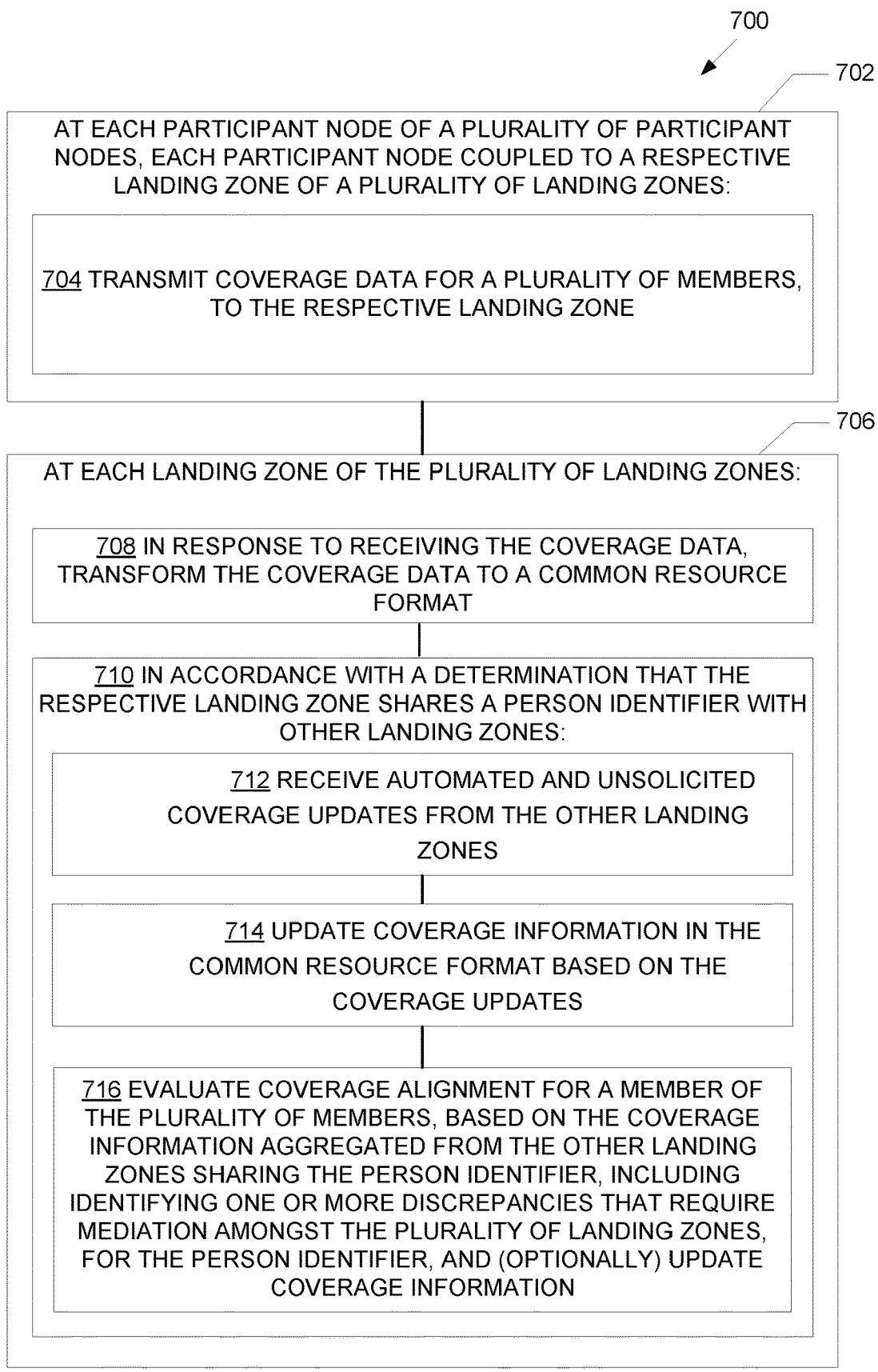
FIG. 7 shows a flowchart of an example method for coverage alignment, according to some implementations.

FIG. 7 shows a flowchart of an example method 700 for network synchronization, according to some implementations. The method includes performing (702) the following steps at each participant node of a plurality of participant nodes (e.g., the internal systems 502, 504). Each participant node is coupled to a respective landing zone of a plurality of landing zones (e.g., the participant environments 506 and 508). The step includes transmitting (704) coverage data for a plurality of members, to the respective landing zone, an example of which is shown and described above in reference to FIG. 5 (step 1), according to some implementations. The method also includes performing (706) at least the following steps at each landing zone of the plurality of landing zones. The steps includes, in response to receiving the coverage data, transforming (708) the coverage data to a common resource format (e.g., FHIR). The steps also includes in accordance with a determination (710) that the respective landing zone shares a person identifier with other landing zones: receiving (712) unsolicited coverage updates from the other landing zones; updating (714) coverage information in the common resource format based on the unsolicited coverage updates; and evaluating (716) coverage alignment for a member of the plurality of members, based on the coverage information aggregated from the other landing zones in the plurality of landing zones sharing the person identifier, including identifying one or more discrepancies (sometimes referred to as misalignments) that require mediation amongst the plurality of landing zones, for the person identifier. Examples of these operations are described above in reference to FIG. 5, according to some implementations.

In some implementations, the method further includes, at a first participant node (e.g., the internal systems 502) of the plurality of participant nodes: receiving the updated coverage information from a first landing zone (e.g., the participant environment 506) of the plurality of landing zones; receiving an updated record containing a modification to a specific data element in the updated coverage information; and transmitting the modification to the first landing zone. The method further includes, at the first landing zone: receiving, from the participant node, and using, the modification to resolve the one or more discrepancies; and propagating the modification to landing zones (e.g., the participant environment 508) other than the first landing zone that share the person identifier.

In some implementations, the method further includes: providing a user interface (e.g., a user interface showing the initial detail view 1 described above in reference to FIG. 6) for the user to review the coverage data against the updated coverage information; providing, via the user interface, recommended actions for the user to take to align their organization's coverage data; and providing, via the user interface, a mechanism for the user to provide input on what actions were taken and review a history of previous actions taken by other users.

In some implementations, the coverage data transmitted by each participant node includes (i) known active coverage records, (ii) inactive coverage records, and (iii) update to coverage records.

In some implementations, the method further includes: at a first landing zone of the plurality of landing zones: resolving the one or more discrepancies by mediating amongst one or more landing zones that share the person identifier. For example, in FIG. 5, the participant environment 506 may resolve misalignments by mediating with the participant environment 508, if the two share a same person identifier.

In some implementations, the method further includes: at each of the landing zones: evaluating the coverage alignment, and resolving any identified discrepancies, before providing an approval for a service for the member. For example, each participant environment in FIG. 5 may evaluate coverage alignment, and resolve any misalignments. Subsequently, a participant environment (e.g., the participant environment 506) may provide an approval to the internal systems 502, for a service for a member.

In some implementations, the method further includes: at each of the landing zones: evaluating the coverage alignment, and resolving any identified discrepancies, on a periodic basis. For example, the participant environments 506 and 508 may each be scheduled to evaluate and/or resolve any misalignments, at same or different periodic intervals, on a pro-active basis.

In some implementations, the method further includes: at a first participant node (e.g., the internal systems 502) of the plurality of participant nodes: transmitting the coverage data for the plurality of members, to the respective landing zone (e.g., the participant environment 506), via a push or pull integration with the respective landing zone.

In some implementations, the method further includes: at each of the landing zones: in response to receiving the coverage data: abstracting a subset of person identity information from the coverage data; transmitting the subset to an identity matching service (e.g., the identity matching service 520); and receiving the person identifier from the identity matching service, in response.

In some implementations, the method further includes: at a first landing zone of the plurality of landing zones: in response to receiving the coverage data: transmitting coverage resource locators for the coverage data and the person identifier to a data index service (e.g., the data index service 522); and at the data index service: in response to receiving the coverage resource locators and the person identifier: registering resources corresponding to the coverage resources so they can become discoverable.

In some implementations, the method further includes: at the data index service (e.g., the data index service 522): in response to receiving the coverage resource locators and the person identifier: identifying other coverage resources provided by other participant nodes that share the person identifier; confirming with a authorization service (e.g., the authorization service 524) if is appropriate to notify each participant node with shared knowledge of the person identifier about available resources; and upon a positive confirmation from the authorization service, notifying each participant node's application (e.g., the application 526) of resource locations of the coverage resource locators. The method further includes, at the authorization service: analyzing contractual terms indicating what participant nodes are subscribed to what solutions and what resource types those solutions necessitate to verify data sharing request from the data index service and notifying the data index service if information sharing between participant nodes is appropriate.

In some implementations, the method further includes: at a first landing zone (e.g., the participant environment 506) of plurality of landing zones: subscribing to an automated notification feature of the data index service, thereby receiving a notification of the resource locations of coverage data stored in each participant node's Fast Healthcare Interoperability Resources (FHIR) server (e.g., the FHIR server 510); acquiring own coverage resource from a FHIR server; issuing a request to FHIR server of other participant nodes (e.g., the FHIR server 512) with a shared person identifier. The request contains the other participant nodes' FHIR server resource locations for a requested coverage resource; and in response, receiving a coverage resource from the other participant nodes. The method further includes, at landing zones corresponding to the other participant nodes; in response to receiving a request to share a coverage resource: verifying sharing appropriateness with the authorization service (e.g., the authorization service 524); and in response to a positive confirmation from the authorization service, responding, via participant node's FHIR server, with the coverage resource to the requesting participant node's coverage application.

In some implementations, the method further includes recording, to a blockchain (e.g., the blockchain 528), events associated with issuing the request to the FHIR server of other participant nodes, receiving the coverage resource from the other participant nodes, and responses with the coverage resource, without protected health information.

In some implementations, the method further includes: at a first landing zone: providing a coverage synchronization user interface for a user, to access a work queue for viewing coverage records submitted by the plurality of participant nodes; selecting, by the user, via the coverage synchronization user interface, a coverage record to view coverage details that include coverage synchronization review outcomes for each participant node that provided coverage for a person identifier; viewing, by the user, coverage details for each participant node that assists the user to discern relevant data for understanding a recommended action and applying the recommended action in a source system; performing necessary adjustments to a record in the source system, including recording, by the user, action they took in the source system and in the coverage synchronization user interface; indicating, by the user, if they applied the recommended action or took a different action or no action; in accordance with the user taking a different action than was recommended by the coverage synchronization user interface, applying, by the user, a note documenting the discrepancy between the recommended action and a final determination made by the user; where a user applied an update or change to the record in the source system, providing, by the source system, an updated coverage resource to the participant node's coverage data store; distributing, by the participant node, the updated coverage resource to their environment via their push or pull integration; and after applying an update or change to the coverage record in the source system, providing, to the user, coverage record in the coverage synchronization user interface.

In this way, the techniques described herein can help achieve several coverage alignment objectives. Systems according to the techniques described herein can help ensure providers always have current and up-to-date coverage details for known patients, ensure payers always have current and up-to-date Coordination of Benefits details for known members, find unknown insurance (provider identified), find unknown insurance (payer identified), find and fix incorrect payer details, find and fix inactive coverage, find and fix insurance priority misalignment, provide transparency and accountability for repairs, and/or reduce denials, incorrect payments, takebacks, and call center volume. Besides, various coverage questions can be addressed, such as the following. Do each payer and provider have the most current details of a person's coverage detail? Does the patient have active coverage? Does a provider know about coverage that another provider or payer does not know? Does a payer know about coverage that another payer or provider does not know? Are all coverage details associated with a recorded payer coverage policy correct and exact where required? Does a payer or provider reflect active coverage when coverage is inactive? Does a payer have correct and up-to-date information about other payer coverage details? Do payers and providers who service the same individual all align on insurance priority? For all payers and providers who service the same individual, does any one of the organizations currently have incorrect coverage information?

Example coverage evaluation benefits include the following. Comparing a payer's active coverage data with a provider's patient encounters helps a provider discover missing coverage, comparing a payer's active coverage data with another payer's active coverage data, helps a payer discover conflicting coverage. Comparing a payer's inactive coverage data with another payer's active coverage data, helps a payer discover inactive or conflicting coverage. Comparing a payer's active coverage data with a provider's self-pay patients, helps a provider find missing coverage. Comparing a payer's active coverage data with a provider's active coverage data helps a provider find incorrect coverage. Comparing a payer's active coverage for non-participating payers with a Provider's active coverage, helps a provider discover other payer missing coverage. Comparting a provider's active coverage for participating and non-participating payers, with a payer's active coverage, helps a payer discover missing or conflicting coverage. Comparing a provider's active coverage with a participating payer's inactive data, helps a provider identify inactive coverage. Comparing a provider's active coverage data with a payer's non-participating inactive payer coverage data, helps a provider identify inactive coverage. Comparing a participating payer's active data with another Participating payer's inactive data, helps a payer identify inactive coverage. Comparing a provider's inactive non-participating payer coverage data with a payer's active non-participating payer coverage data, helps a payer identify inactive coverage.

There are several differences between the techniques described herein and conventional systems. All organizations participating in the solution can provide all their known active coverage records for members or patients. This differs from traditional electronic data interchange) EDI exchange for discovering coverage updates that require a per-patient request and response. All organizations participating in the solution can provide all their known other payer's active coverage records for members or patients. This differs from traditional EDI exchange for discovering coverage updates that may not always provide all known other coverage. All organizations participating in the solution can provide all their known inactive coverage records for members/patients (going back 1 year). This differs from traditional EDI exchange for discovering expired coverage that does not offer unsolicited updates on recently cancelled coverage policies. This differs from traditional EDI exchange for discovering expired coverage that does not offer information on the termination date of the coverage. All organizations participating in the solution can provide all their known other payer inactive coverage records for members/patients (going back 1 year). This differs from traditional EDI exchange for discovering coverage updates that do not offer unsolicited updates on recently re-evaluated insurance priority determinations due to other payer coverage changes. Automated and unsolicited coverage updates can be provided each time there is a change to coverage for any field in the coverage data spec. This differs from traditional EDI exchange for discovering coverage updates that do not offer unsolicited updates for coverage changes (such as life-change events). This differs from traditional EDI exchange for discovering coverage updates that requires a provider to issue multiple EDI request on a registration, encounter, and pre-bill basis to ensure they always have the latest coverage details. Exchange of coverage can be provided using real-time normalized FHIR standard data. This differs from traditional means for sharing coverage data from source systems that is not normalized and standardized, to allow for coverage comparison analysis, to ensure clean data for billing and payment transactions. Exchange of coverage data can be directly shared between payers and providers. This differs from traditional channels that transact data through a third party, like a clearinghouse. With coverage alignment, participants can exchange coverage details directly with one another without the detail data ever being seen or stored within a healthcare network environment. This differs from entities facilitating EDI transaction exchange, that often aggregate knowledge of coverage from EDI transactions and re-sell information to payers and providers seeking coverage discovery. Coverage alignment data is distributed to each application participant so that tall participants have the same coverage data where they share a network identifier or person identifier. This differs from traditional means for sharing coverage data, where coverage records are shared unidirectionally between only two parties, rather than multi-directionally from all parties that service the same person. Coverage evaluation can be executed locally by each participant's application instance, running the same coverage alignment evaluation business logic. This differs from traditional means for analyzing coverage data that is typically accomplished through a third-party centralized application and centralized data store model. Each application instance in each landing zone can run the same coverage alignment evaluation, independently determining issues that require remediation by participating organizations. This differs from traditional methods of executing business logic on data, where organizations have limited visibility into the rules being executed on behalf of all other organizations. Participants can see their own provided coverage as well as coverage provided by other participants for the same serviced individual. This differs from traditional visibility into multi-party coverage, where the only means of 'seeing' what a partner organization currently shows for coverage, is to issue multiple singular data requests. This differs from traditional visibility into multi-party coverage, where one participant has no means of knowing if a partner participant has misaligned coverage that may result in transaction issues. Participants can have full transparency of all known coverage for a patient or member. This differs from traditional visibility into known coverage, where organizations are frequently unaware of new coverage or plan changes. Participants can have full visibility into the correct and authoritative coverage details they need to make sure their organizations coverage is aligned and accurate, including instructions to remediate coverage issues when found to be out of alignment. This differs from traditional coverage data management, where users are unaware of unresolved coverage issues or are unaware they may have introduced errors in coverage during the capture process. This differs from traditional coverage updating that does not identify mis-alignment issues. Participants can have transparency into whether other participants have or have not remediated misaligned coverage issues in a timely manner upon notification. This differs from traditional coverage data management, where quality auditability is not available.

The techniques described herein provide several advantages for implementing coverage alignment when compared with conventional systems. From a data exchange perspective, participant nodes gain access to real-time unsolicited coverage updates from participant source systems. Participant nodes can access known active and inactive coverage. Unlike conventional systems, participant data is shared directly between partners with no third party. Data is not shared without automated and auditable permission evaluation. Immutable record of data processing and sharing events is stored on a blockchain ledger. From an application perspective, distributed application means no governing centralized application instance. Rule evaluation is run locally within each participant's application instance. Same application instance operates in each participant's virtual private cloud. Business evaluation logic can be executed with applications running in the participant's private cloud or via smart contracts on one of the blockchains or both. Coverage data is stored and exchanged based on a common FHIR standard. From a transparency perspective, provider participation ensures eco-system accuracy and alignment. Participants have knowledge of current coverage prior to encounters and billing events, and gain visibility into partner coverage issues requiring remediation. In some implementations, the system monitors participant progress in remediating misalignment issues, and/or determines when all parties have the same coverage detail in their source systems. A peer-to-peer network is used for direct communication between parties involved and for performing a same process across providers and payers. Standardized formats are used across providers and payers for coverage records. Some implementations uses a subscription model to immediately and proactively detect any changes in coverage information in any participant's system. Where differences are found, recommendations are automatically generated to bring the records into alignment. Some implementations provide a review user interface for use by providers and payers to review automated recommendations and make adjustments as appropriate. According to some implementations, the system continuously learns over time. For example, when participants see that the recommendations are appropriate, they may permit the automated updating of their local records for some misalignment reason codes, reducing the time to bring coverage records into alignment. With synchronized coverage records across participants, the time to submit and get a claim adjudicated (processed) reduces, especially when there are changes to coverage and/or multiple possible health plans that may provide some coverage.

Each of the above identified elements may be stored in one or more memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory may store a subset of the modules and data structures identified above. Furthermore, the memory may store additional modules and data structures not described above.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A distributed computing system for network synchronization, the system comprising:
   a plurality of participant nodes communicatively coupled to each other, wherein each participant node comprises:
      a source system configured to maintain coverage records;
      a coverage data store configured to store coverage data for a plurality of members; and
      an integration interface configured to push or pull coverage data updates to and from a respective landing zone;
   a plurality of landing zones communicatively coupled to each other, wherein each landing zone is coupled to a respective participant node of the plurality of participant nodes, and wherein each landing zone comprises:
      an interface engine configured to transform coverage data to a common resource format;
      a Fast Healthcare Interoperability Resources (FHIR) server configured to receive and store coverage data;
      a data storage capability configured to handle, store and retrieve requests from applications running in the landing zone;
      an authentication tool configured to enforce permissions and access policy; and
      a coverage alignment application configured to evaluate coverage records, wherein the coverage alignment application of each landing zone comprises:
         a remediation engine configured to:
            identify one or more discrepancies that require remediation amongst the plurality of landing zones for the person identifier;
            generate remediation instructions to resolve the identified discrepancies, wherein the remediation instructions include specific actions to be taken by particular landing zones to synchronize coverage information across the system; and
            propagate the remediation instructions to the particular landing zones to facilitate real-time coverage synchronization; and
         a blockchain interface configured to:
            record to a blockchain events associated with the coverage alignment evaluation and remediation, without including associated protected health information, sufficient to provide an immutable audit trail of coverage synchronization activities;
   wherein each participant node is configured to transmit coverage data for the plurality of members to the respective landing zone via the integration interface; and
   wherein each landing zone is configured to:
      in response to receiving the coverage data, use the interface engine to transform the coverage data to the common resource format;
      in accordance with a determination that the respective landing zone shares a person identifier with other landing zones:
         receive unsolicited coverage updates from the other landing zones through a peer-to-peer exchange without central storage;
         update coverage information in the common resource format based on the unsolicited coverage updates in the FHIR server; and
      evaluate coverage alignment for a member of the plurality of members, using the coverage alignment application, based on the coverage information aggregated from the other landing zones in the plurality of landing zones sharing the person identifier, including identifying one or more discrepancies that require remediation amongst the plurality of landing zones, for the person identifier, generating remediation instructions to resolve the identified discrepancies, and propagating the remediation instructions to the particular landing zones to facilitate real-time coverage synchronization.

2. The system of claim 1, wherein:
a first participant node of the plurality of participant nodes is configured to:
receive the updated coverage information from a first landing zone of the plurality of landing zones;
receive an updated record containing a modification to a specific data element in the updated coverage information; and
transmit the modification to the first landing zone;
the first landing zone is configured to:
receive, from the first participant node, and using, the modification to resolve the one or more discrepancies; and
propagate the modification to landing zones other than the first landing zone that share the person identifier.

3. The system of claim 2, wherein:
the first participant node of the plurality of participant nodes is further configured to:
provide a user interface for a user to review the coverage data against the updated coverage information;
provide, via the user interface, recommended actions for the user to take to align their organization's coverage data; and
provide, via the user interface, a mechanism for the user to provide input on what actions were taken and review a history of previous actions taken by other users.

4. The system of claim 1, wherein the coverage data transmitted by each participant node includes (i) known active coverage records, (ii) inactive coverage records, and (iii) update to coverage records.

5. The system of claim 1, wherein:
a first landing zone of the plurality of landing zones is configured to:
resolve the one or more discrepancies by remediating amongst one or more landing zones that share the person identifier.

6. The system of claim 1, wherein:
each of the landing zones is configured to:
evaluate the coverage alignment, and resolve any identified discrepancies, before providing an approval for a service for the member.

7. The system of claim 1, wherein:
each of the landing zones is configured to:
evaluate the coverage alignment, and resolve any identified discrepancies, on a periodic basis.

8. The system of claim 1, wherein:
a first participant node of the plurality of participant nodes is configured to:
transmit the coverage data for the plurality of members, to the respective landing zone, via a push or pull integration with the respective landing zone.

9. The system of claim 1, wherein:
each of the landing zones is configured to:
in response to receiving the coverage data:
extract a subset of person identity information from the coverage data;
transmit the subset of person identity information to an identity matching service; and
receive the person identifier from the identity matching service, in response.

10. The system of claim 1, wherein:
a first landing zone of the plurality of landing zones is configured to:
in response to receiving the coverage data:
transmit coverage resource locators for the coverage data and the person identifier to a data index service; and
the data index service is configured to:
in response to receiving the coverage resource locators and the person identifier:
register resources corresponding to the coverage resource locators so they can become discoverable.

11. The system of claim 10, wherein:
the data index service is configured to:
in response to receiving the coverage resource locators and the person identifier:
identify other coverage resources provided by other participant nodes that share the person identifier;
confirm with a authorization service if is appropriate to notify each participant node with shared knowledge of the person identifier about available resources; and
upon a positive confirmation from the authorization service, notify each participant node's application of resource locations of the coverage resource locators; and
the authorization service is configured to:
analyze contractual terms indicating what participant nodes are subscribed to what solutions and what resource types those solutions necessitate to verify data sharing request from the data index service and determine if information sharing between participant nodes is appropriate.

12. The system of claim 11, wherein:
a first landing zone of plurality of landing zones is configured to:
subscribe to an automated notification feature of the data index service, thereby receiving a notification of the resource locations of coverage data stored in each participant node's Fast Healthcare Interoperability Resources (FHIR) server;
acquire own coverage resource from a FHIR server;
issue a request to FHIR server of other participant nodes with a shared person identifier, wherein the request contains the other participant nodes' FHIR server resource locations for a requested coverage resource; and
in response, receive a coverage resource from the other participant nodes; and landing zones corresponding to the other participant nodes configured to;
in response to receiving a request to share a coverage resource:
verify sharing appropriateness with the authorization service; and
in response to a positive confirmation from the authorization service, respond, via a corresponding participant node's FHIR server, with the coverage resource to a requesting participant node.

13. The system of claim 12, wherein:
the first landing zone of the plurality of landing zones is further configured to:
record, to a blockchain, events associated with issuing the request to the FHIR server of other participant nodes, receiving the coverage resource from the other participant nodes, without protected health information.

14. The system of claim 1, wherein:
a first landing zone of the plurality of landing zones is further configured to:

provide a coverage alignment user interface for a user, to access a list for viewing coverage records submitted by the plurality of participant nodes;

receive a selection, by the user, via the coverage alignment user interface, a coverage record to view coverage details that include coverage alignment review outcomes for each participant node that provided coverage for a person identifier;

provide, for the user, coverage details for each participant node that assists the user to discern relevant data for understanding a recommended action and applying the recommended action in a source system;

perform necessary adjustments to a record in the source system, including recording, by the user, action they took in the source system and in the coverage alignment user interface;

receive an indication, by the user, if they applied the recommended action or took a different action or no action;

in accordance with the user taking a different action than was recommended by the coverage alignment user interface, apply a note documenting the discrepancy between the recommended action and a final determination made by the user;

where a user applied an update or change to the record in the source system, provide, by the source system, an updated coverage resource to a corresponding participant node's coverage data store;

distribute, by the corresponding participant node, the updated coverage resource to their environment via their push or pull integration; and after applying an update or change to the coverage record in the source system, provide, to the user, coverage record in the coverage alignment user interface.

15. The system of claim 1, wherein each landing zone is communicatively coupled to other landing zones of the plurality of landing zones, and wherein each landing zone includes at least (i) an interface engine configured to transform coverage data to a common resource format, (ii) a Fast Healthcare Interoperability Resources (FHIR) server configured to receive and store coverage data, (iii) a data storage configured to handle store and retrieve requests from applications running in the landing zone, and (iv) an authentication tool configured to enforce permissions and access policy.

16. A method for network synchronization, the method comprising:
at each participant node of a plurality of participant nodes, each participant node coupled to a respective landing zone of a plurality of landing zones:
    maintaining coverage records in a source system;
    storing coverage data for a plurality of members in a coverage data store;
    pushing or pulling coverage data updates to and from a respective landing zone via an integration interface; and
    transmitting coverage data for a plurality of members, to the respective landing zone; and
at each landing zone of the plurality of landing zones:
    transforming coverage data to a common resource format using an interface engine;
    receiving and storing coverage data in a Fast Healthcare Interoperability Resources (FHIR) server;
    handling, storing and retrieving requests from applications running in the landing zone using a data storage;
    enforcing permissions and access policy using an authentication tool;
    in response to receiving the coverage data, transforming the coverage data to a common resource format;
    in accordance with a determination that the respective landing zone shares a person identifier with other landing zones:
        receiving unsolicited coverage updates from the other landing zones through a peer-to-peer exchange without central storage;
        updating coverage information in the common resource format based on the unsolicited coverage updates in the FHIR server; and
        evaluating coverage alignment for a member of the plurality of members using a coverage alignment application, based on the coverage information aggregated from the other landing zones in the plurality of landing zones sharing the person identifier, including:
            identifying one or more discrepancies that require mediation amongst the plurality of landing zones, for the person identifier;
            generating remediation instructions to resolve the identified discrepancies, wherein the remediation instructions include specific actions to be taken by particular landing zones to synchronize coverage information across the system;
            propagating the remediation instructions to the particular landing zones to facilitate real-time coverage synchronization; and
            recording to a blockchain events associated with the coverage alignment evaluation and remediation, without including associated protected health information, sufficient to provide an immutable audit trail of coverage synchronization activities.

17. The method of claim 16, further comprising:
at a first participant node of the plurality of participant nodes:
    receiving the updated coverage information from a first landing zone of the plurality of landing zones;
    receiving an updated record containing a modification to a specific data element in the updated coverage information; and
    transmitting the modification to the first landing zone;
at the first landing zone:
    receiving, from the participant node, and using, the modification to resolve the one or more discrepancies; and
    propagating the modification to landing zones other than the first landing zone that share the person identifier.

18. The method of claim 17, further comprising:
providing a user interface for a user to review the coverage data against the updated coverage information;
providing, via the user interface, recommended actions for the user to take to align their organization's coverage data; and
providing, via the user interface, a mechanism for the user to provide input on what actions were taken and review a history of previous actions taken by other users.

19. The method of claim 16, further comprising:
at a first landing zone of the plurality of landing zones:
    in response to receiving the coverage data:
        transmitting coverage resource locators for the coverage data and the person identifier to a data index service;

at the data index service:
  in response to receiving the coverage resource locators and the person identifier:
    registering the coverage resource locators so they can become discoverable;
    identifying other coverage resources provided by other participant nodes that share the person identifier;
    confirming with an authorization service if is appropriate to notify each participant node with shared knowledge of the person identifier about available resources; and
    upon a positive confirmation from the authorization service, notifying each participant's node of resource locations of the coverage resource locators; and
at the authorization service:
  analyzing contractual terms indicating what participant nodes are subscribed to what application and what resource types those solutions necessitate to verify data sharing requests.

20. The method of claim 16, further comprising:
at a first landing zone of plurality of landing zones:
providing a coverage synchronization user interface for a user, to access a list for viewing coverage records submitted by the plurality of participant nodes;
obtaining selection, by the user, via the coverage synchronization user interface, a coverage record to view coverage details that include coverage synchronization review outcomes for each participant node that provided coverage for a person identifier;
providing, to the user, via the coverage synchronization user interface, coverage details for each participant node that assists the user to discern relevant data for understanding a recommended action and applying the recommended action in a source system;
obtaining necessary adjustments to a record in the source system, including recording, by the user, action they took in the source system and in the coverage synchronization user interface;
obtaining an indication, by the user, if they applied the recommended action or took a different action or no action;
in accordance with the user taking a different action than was recommended by the coverage synchronization user interface, applying, for the user, a note documenting the discrepancy between the recommended action and a final determination made by the user;
where a user applied an update or change to the record in the source system, providing, by the source system, an updated coverage resource to a corresponding participant node's coverage data store;
distributing, by the corresponding participant node, the updated coverage resource to their landing zone via their push or pull integration; and
after applying an update or change to the coverage record in the source system, providing, to the user, coverage record in the coverage synchronization user interface.

* * * * *